US008060577B1

(12) United States Patent
Conrad

(10) Patent No.: US 8,060,577 B1
(45) Date of Patent: Nov. 15, 2011

(54) METHOD AND SYSTEM FOR EMPLOYING USER INPUT FOR FILE CLASSIFICATION AND MALWARE IDENTIFICATION

(75) Inventor: Robert James Conrad, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 330 days.

(21) Appl. No.: 12/491,430

(22) Filed: Jun. 25, 2009

(51) Int. Cl.
G06F 15/167 (2006.01)
(52) U.S. Cl. .......................................... 709/216; 709/206
(58) Field of Classification Search .................. 709/206, 709/216
See application file for complete search history.

(56) References Cited

U.S. PATENT DOCUMENTS 7,941,382 B2 * 5/2011 Stokes et al. .................... 706/20
2003/0236845 A1 * 12/2003 Pitsos ............................ 709/206

OTHER PUBLICATIONS

Bailey et al., "Automated Classification and Analysis of Internet Malware", Apr. 26, 2007, pp. 1-18 [online]. Retrieved on Sep. 3, 2009 from the Internet: <URL:http://www.eecs.umich.edu/techreports/cse/2007/CSE-TR-530-07.pdf>.
Oiaga, "Microsoft Malware Classification by Species and Prevalence", Apr. 25, 2007, pp. 1-2 [online]. Retrieved on Sep. 3, 2009 from the Internet: <URL:http://news.softpedia.com/news/Microsoft-Malware-Classification-by-Species-and-Prevalence-53112.shtml>.

* cited by examiner

*Primary Examiner* — Joseph Avellino
*Assistant Examiner* — Marshall McLeod
(74) *Attorney, Agent, or Firm* — Gunnison, McKay & Hodgson, L.L.P.; Philip McKay

(57) ABSTRACT

A method and apparatus for employing user input to classify unknown files whereby when a given unknown/unclassified file is downloaded and/or activated on a given computer system associated with a given user, the given user is asked to provide input regarding the legitimacy of the given unknown/unclassified file. The classification of the given unknown/unclassified file is then determined via one or more sources other than the given user's input. The accuracy of the given user's input regarding the legitimacy of the given unknown/unclassified file is then determined and used to calculate, and/or transform, a reliability score that is then associated with the given user. A given user's reliability score is then used to determine the given user's eligibility to provide further input regarding the legitimacy of other unknown/unclassified files, and/or to determine a value to be place on, or otherwise filter, future input from the given user regarding the legitimacy of other unknown/unclassified files.

20 Claims, 4 Drawing Sheets

METHOD AND SYSTEM FOR EMPLOYING USER INPUT FOR FILE CLASSIFICATION AND MALWARE IDENTIFICATION

BACKGROUND OF THE INVENTION

One of the largest issues facing modern computing systems and communications systems is the prevalence of malware. Herein, malware includes, but is not limited to, any software and/or code designed to infiltrate a computing system without the owner's informed and/or explicit consent. Some of the better known forms of malware include computer viruses and spyware.

One common mechanism used to transfer malware onto a target computing system involves one or more files being transferred and/or downloaded onto a memory, or other subsystem, of the target computing system via file transfer from another computing system, and/or database, and/or the Internet and/or other network, and/or from a computer program product. Typically, once transferred, the malware is then activated on the target computing system, often by an innocent action taken by the user of the target computing system such as opening an e-mail attachment or inadvertently opening a file and/or executable.

One conventional method for preventing the transfer of malware is to employ a security system, typically in the form of a software application, and/or hardware, installed either on a given "protected" computing system or on a server system associated with the given computing system.

Many conventional security systems attempt to identify malware and block the transfer of the malware onto protected computing systems. One way conventional security systems attempt to identify malware is to analyze and classify incoming files as either potential malware or potential "legitimate" files/applications. Conventionally this is accomplished by analyzing incoming files and comparing various characteristics of incoming files with characteristics of known malware and/or known legitimate files. It follows that in order for conventional security systems to identify malware based on the type of comparison analysis described above, the security systems must have one or more sources of knowledge/data regarding characteristics of identified malware, or legitimate file, to make the comparison. However, in many cases, these sources of knowledge/data regarding characteristics of identified malware, or legitimate files, are limited in the type of information they can provide.

For instance, in cases of new types of files that are not similar enough to identified malware, or legitimate files, there is often no reliable source of knowledge/data regarding characteristics of identified malware, or legitimate file, that is of significant use for making a comparative analysis, at least when the new types of files first appear. Consequently, a significant amount of time may pass before enough reliable data can be collected, and/or analysis can be performed, to make a reasonable classification of the new types of malware and/or new types of legitimate file. This is equally true in cases of rarely occurring malware and/or legitimate files. In addition, virtually every conventional security system that employs a file classification scheme has areas, i.e., types of files, that the security system cannot reliably classify as either malicious or legitimate for any one of various other reasons.

As a result of the situation described above, many new files, both malware and legitimate files, are currently incorrectly classified using conventional security systems. As a result, using conventional security systems, legitimate applications are often incorrectly classified as potential malware and are therefore blocked, often to the annoyance of the end user, or malware applications are potentially not identified, and therefore are not blocked, thus leaving numerous computing systems susceptible to infiltration and/or or damage.

SUMMARY

According to one embodiment of a method and apparatus for employing user input to classify unknown files, when a given unknown/unclassified file is downloaded and/or activated on a given computer system associated with a given user, the given user is asked to provide input regarding the legitimacy of the given unknown/unclassified file. In one embodiment, the classification of the given unknown/unclassified file is then later determined via sources other than the given user's input. In one embodiment, the accuracy of the given user's input regarding the legitimacy of the given unknown/unclassified file is then determined and used to calculate, and/or transform, a reliability score that is then associated with the given user. In one embodiment, a given user's reliability score is then used to determine the given user's eligibility to provide further input regarding the legitimacy of other unknown/unclassified files, and/or to determine a value to be place on, or otherwise filter, future input from the given user regarding the legitimacy of other unknown/unclassified files.

Using one embodiment of the method and system for employing user input to classify unknown files, as discussed herein, the reliability of a given user is established based on actual empirical data indicating the user's reliability as a source of input regarding the legitimacy of unknown/unclassified files. In one embodiment, a pool of users of proven ability to classify unknown/unclassified files is then created and used to help classify future new unknown/unclassified files that are actually downloaded and/or activated on the users' computing systems. Consequently, using one embodiment of the method and system for employing user input to classify unknown files, as discussed herein, a pool of users of proven ability is created and used to supplement a security system and/or a file classification system in instances where the security system and/or a file classification system is unable to classify a given file. As a result, using one embodiment of the method and system for employing user input to classify unknown files, as discussed herein, provides security systems and/or file classification systems crucial input to cover security gaps that arise due to lack of available comparison and/or file classification data.

In addition, using one embodiment of the method and system for employing user input to classify unknown files, as discussed herein, user's are assigned a user reliability score, and their input is valued, based on actual empirical data indicating the user's reliability as a source of data regarding the legitimacy of unknown/unclassified files. Consequently, using one embodiment of the method and system for employing user input to classify unknown files, as discussed herein, the fact that users have varying levels of ability to correctly classify new unknown/unclassified files as legitimate or malicious is addressed by the fact that the a given user's input is valued based on the user's actual historical performance.

In addition, using one embodiment of the method and system for employing user input to classify unknown files, as discussed herein, user's are only asked to provide input regarding the legitimacy of unknown/unclassified files actually downloaded and/or activated on the user's computing system. Consequently, using one embodiment of the method and system for employing user input to classify unknown files, as discussed herein, user's are only contacted for data that is relevant to the user; thereby avoiding unnecessary interference with the user's activities and potentially eliminating irrelevant user input requests.

In addition, using one embodiment of the method and system for employing user input to classify unknown files, as discussed herein, a given user's input regarding the legitimacy of unknown/unclassified files is monitored and the given user's reliably score is updated. Consequently, if a given user's reliability score changes, the classification of the user, and/or the value placed on the user's input, is updated to reflect the change. As a result, the value assigned to a given user's input is dynamic and reflective of the user's current activity. This feature not only ensures that a user's input is more accurately valued, but it also helps prevent the an given user from "gaming" the security system by first establishing themselves as one classification of user, such as a user having a high reliability score, and then providing false input in order to circumvent the security system, or at least degrade its effectiveness.

In addition, one embodiment of the method and system for employing user input to classify unknown files, as discussed herein, input from user's with both high and low reliability scores can be utilized. In one embodiment, input from a user having a high reliability score is valued based on the user's reliably score and the actual file classification input provided by the user is used. On the other hand, input from a user having a low reliability score is also valued based on the user's reliably score but is treated as inverse classification data, i.e., the opposite classification to that provided by the user is applied. In short, the user with a low reliability score is treated as a consistently incorrect, or hostile, classifier.

As a result of these and other features described herein, using various embodiments of the method and system for employing user input to classify unknown files, as discussed herein, new files, both malware and legitimate files, that are currently incorrectly classified using conventional security systems, can be more accurately and consistently classified; thereby providing more complete and consistent protection of computing, information sharing, and communication systems.

Figure 1:
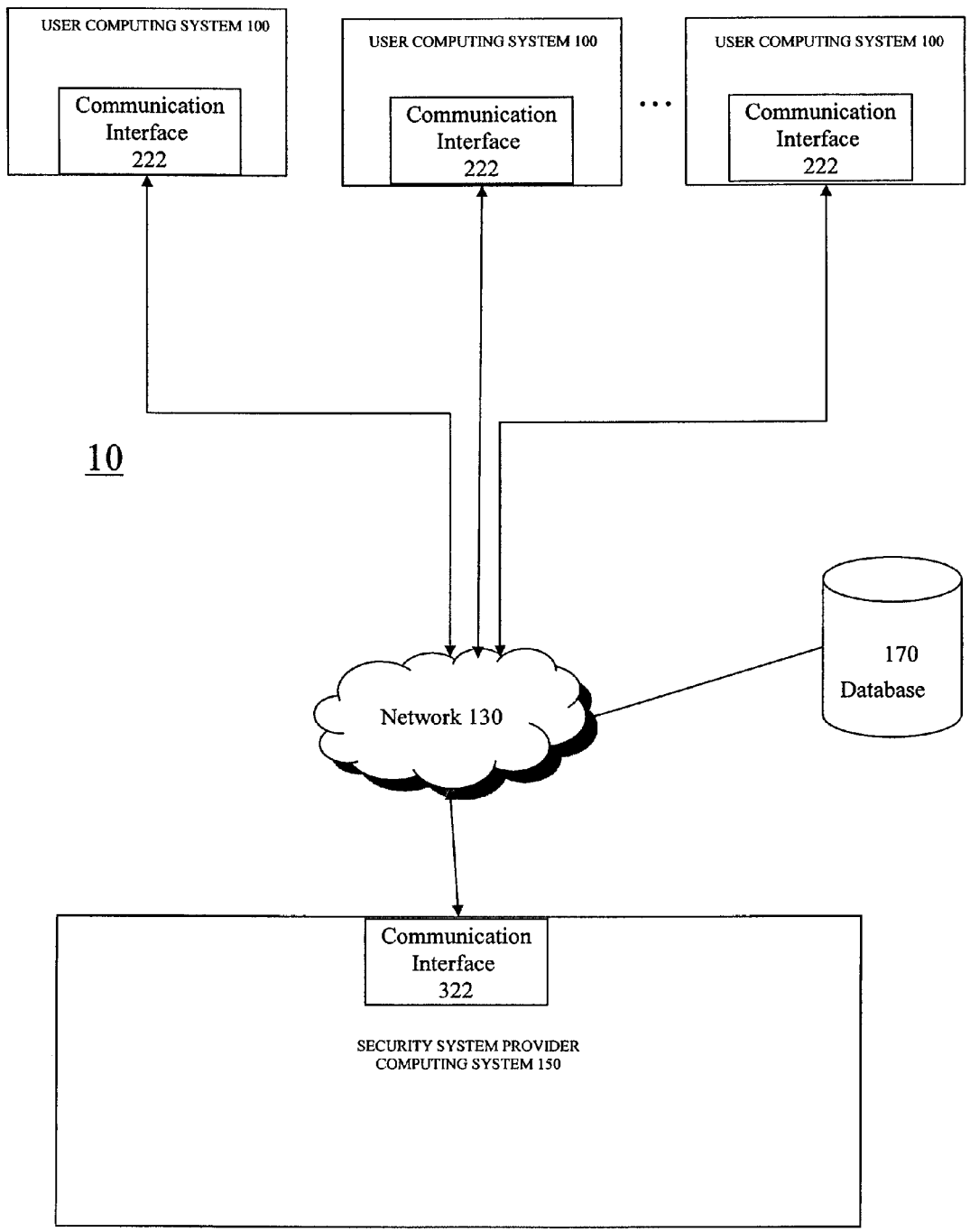
FIG. 1 is a block diagram of an exemplary hardware architecture for implementing one embodiment including user computing systems, a communication network, a database, and a security system provider computing system, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment of a method and apparatus for employing user input to classify unknown files, when a given unknown/unclassified file is downloaded and/or activated on a given computer system associated with a given user, the given user is asked to provide input regarding the legitimacy of the given unknown/unclassified file. In one embodiment, the classification of the given unknown/unclassified file is then later determined via sources other than the given user's input. In one embodiment, the accuracy of the given user's input regarding the legitimacy of the given unknown/unclassified file is then determined and used to calculate, and/or transform, a reliability score that is then associated with the given user. In one embodiment, a given user's reliability score is then used to determine the given user's eligibility to provide further input regarding the legitimacy of other unknown/unclassified files, and/or to determine a value to be place on, or otherwise filter, future input from the given user regarding the legitimacy of other unknown/unclassified files.

In one embodiment, a security system is used to monitor files downloaded onto a given computing system, to identify malware, and to block the transfer of malware onto the given computing system. In one embodiment, the security system is a software application, a software module, a hardware device, and/or a combination of software and hardware, implemented, in whole or in part, on one or more of, given user's computing system, a security system provider's computing system, a third party computing system, a server computing system, or any combination of a given user's computing system, a security system provider's computing system, a server computing system, and/or a third party computing system.

In one embodiment, the given computing system and/or given user is initially selected based on one or more user selection criteria including, but not limited to: random selection; historical infection prevalence of the user computing system; on a opt-in basis; and/or by any other user selection criteria desired by the provider of the security system and/or the process for employing user input to classify unknown files.

In one embodiment, the security system monitors and/or filters files downloaded onto the selected given computing system. In one embodiment, when the security system detects a given new file is downloaded and/or activated on the given computing system, the security system attempts to classify the given file as a malicious or legitimate file based on known files and known file characteristics from one or more sources. In one embodiment, if the given file cannot be classified by the security system, the given file is designated as a given unknown/unclassified file.

In one embodiment, once the given file is designated as a given unknown/unclassified file by the security system, a given user associated with the given computing system is contacted, in one embodiment via a communication network such as the Internet and one or more communication interfaces, and asked to provide input regarding the legitimacy of the given unknown/unclassified file.

In one embodiment, input regarding the legitimacy of the given unknown/unclassified file requested of the given user is a request to indicate if the given unknown/unclassified file was explicitly obtained/requested by the given user and/or if the given unknown/unclassified file is desired by the given user. In one embodiment, the given user is asked to classify the given unknown/unclassified file as legitimate or malicious, and/or as a requested or an un-requested file, and/or as being from a known/trusted source or from an unknown source.

In one embodiment, the requested given user input regarding the legitimacy of the given unknown/unclassified file is submitted by the given user as data, in one embodiment via a user input/output interface and/or a user interface device and a memory associated with the given computing system. In one embodiment, the given user input regarding the legitimacy of the given unknown/unclassified file is used to transform the status of the given unknown/unclassified file to a user-classified given unknown/unclassified file.

In one embodiment, the data representing the requested given user input regarding the legitimacy of the given unknown/unclassified file is transferred to, or otherwise obtained by, the provider of the security system and/or a security system provider computing system having a security system provider computing system memory.

In one embodiment, the data representing the requested given user input regarding the legitimacy of the given unknown/unclassified file is stored in the security system provider computing system memory in a memory location/file associated with the given user and/or the given unknown/unclassified file and is used to transform data stored in the security system provider computing system memory.

In one embodiment, the classification of the given unknown/unclassified file is then determined by use of any one or more of several sources other than the given user input regarding the legitimacy of the given unknown/unclassified file, including, but not limited to: further analysis of the given unknown/unclassified file by the security system and/or security system provider; input from other users; analysis of the given unknown/unclassified file by other parties; and/or other events associated with the given unknown/unclassified file.

In one embodiment, once the classification of the given unknown/unclassified file is determined via sources other than the given user's input, the determined classification of the given unknown/unclassified file is compared with the given user's input regarding the legitimacy of the given unknown/unclassified file to determine the accuracy of the given user's input regarding the legitimacy of the given unknown/unclassified file.

In one embodiment, the results of the comparison of the given user's input regarding the legitimacy of the given unknown/unclassified file and the eventual classification of the given unknown/unclassified file based on other sources is used, in one embodiment, along with other comparisons of the given user's input regarding the legitimacy of the other unknown/unclassified files and the eventual classification of the other unknown/unclassified files based on other sources, to calculate, and/or transform, a reliability score to be associated with the given user.

In one embodiment, a given user's reliability score is then used to transform a classification of the given user as a source of data/input regarding the legitimacy of other unknown/unclassified files. For instance, in one embodiment, a given user's reliability score is used to determine the given user's eligibility to provide any further input regarding the legitimacy of other unknown/unclassified files and to thereby transform the user's status as a source of further input regarding the legitimacy of other unknown/unclassified files. In other embodiments, a given user's reliability score is used to determine a value to be placed on future input from the given user regarding the legitimacy of other unknown/unclassified files, such as a weighting factor, multiplier, or even inverter, to be applied to future input from the given user regarding the legitimacy of other unknown/unclassified files and thereby transform the data representing future input from the given user regarding the legitimacy of other unknown/unclassified files.

In one embodiment, the results of future comparisons of the given user's input regarding the legitimacy of the unknown/unclassified files and the determined classification of the unknown/unclassified files based on other sources are monitored and are analyzed to periodically update the given user's reliability score, thereby transforming the user's reliability score and/or status.

Using one embodiment of a process for employing user input to classify unknown files, as discussed herein, the reliability of a given user is established based on actual empirical data indicating the user's reliability as a source of input regarding the legitimacy of unknown/unclassified files. In one embodiment, a pool of users of proven ability to classify unknown/unclassified files is then created and used to help classify future new unknown/unclassified files that are actually downloaded and/or activated on the users' computing systems. Consequently, using one embodiment of a process for employing user input to classify unknown files, as discussed herein, a pool of users of proven ability is created and used to supplement a security system and/or a file classification system in instances where the security system and/or a file classification system is unable to classify a given file. As a result, using one embodiment of a process for employing user input to classify unknown files, as discussed herein, provides security systems and/or file classification systems crucial input to cover security gaps that arise due to lack of available comparison and/or file classification data.

In addition, using one embodiment of a process for employing user input to classify unknown files, as discussed herein, user's are assigned a user reliability score, and their input is valued, based on actual empirical data indicating the user's reliability as a source of data regarding the legitimacy of unknown/unclassified files. Consequently, using one embodiment of a process for employing user input to classify unknown files, as discussed herein, the fact that users have varying levels of ability to correctly classify new unknown/unclassified files as legitimate or malicious is addressed by the fact that the a given user's input is valued based on the user's actual historical performance.

In addition, using one embodiment of a process for employing user input to classify unknown files, as discussed herein, user's are only asked to provide input regarding the legitimacy of unknown/unclassified files actually downloaded and/or activated on the user's computing system. Consequently, using one embodiment of a process for employing user input to classify unknown files, as discussed herein, user's are only contacted for data that is relevant to the user; thereby avoiding unnecessary interference with the user's activities and potentially eliminating irrelevant user input requests.

In addition, using one embodiment of a process for employing user input to classify unknown files, as discussed herein, a given user's input regarding the legitimacy of unknown/unclassified files is monitored and the given user's reliably score is updated. Consequently, if a given user's reliability score changes, the classification of the user, and/or the value placed on the user's input, is updated to reflect the change. As a result, the value assigned to a given user's input is dynamic and reflective of the user's current activity. This feature not only ensures that a user's input is more accurately valued, but it also helps prevent the an given user from "gaming" the security system by first establishing themselves as one classification of user, such as a user having a high reliability score, and then providing false input in order to circumvent the security system, or at least degrade its effectiveness.

In addition, one embodiment of a process for employing user input to classify unknown files, as discussed herein, input from user's with both high and low reliability scores can be utilized. In one embodiment, input from a user having a high reliability score is valued based on the user's reliably score and the actual file classification input provided by the user is used. On the other hand, input from a user having a low reliability score is also valued based on the user's reliably score but is treated as inverse classification data, i.e., the opposite classification to that provided by the user is applied. In short, the user with a low reliability score is treated as a consistently incorrect, or hostile, classifier.

As a result of these and other features described herein, using various embodiments of a process for employing user input to classify unknown files, as discussed herein, new files, both malware and legitimate files, that are currently incorrectly classified using conventional security systems, can be more accurately and consistently classified; thereby providing more complete and consistent protection of computing, information sharing, and communication systems.

FIG. 1 shows a block diagram of an exemplary hardware system 10 suitable for implementing one embodiment of a process for employing user input to classify unknown files, such as exemplary process 400 of FIG. 4 discussed below. Returning to FIG. 1, exemplary hardware system 10 includes: one or more user computing system(s) 100, including communication interface(s) 222; security system provider computing system 150, including communication interface 322; and database 170; all communicating via communication interfaces 222 and 322 and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as security system provider computing system 150 (discussed below) or any one or more of other user computing system(s) 100.

As used herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing systems as defined herein and/or as known in the art at the time of filing and/or as developed thereafter, that includes components that can execute all, or part, of a process for employing user input to classify unknown files in accordance with at least one of the embodiments as described herein. A more detailed discussion of user computing system(s) 100 is provided below with respect to FIG. 2.

Returning to FIG. 1, in one embodiment, security system provider computing system 150 is any computing system as defined herein and/or as known in the art at the time of filing and/or as developed thereafter, that includes components that can execute all, or part, of a process for employing user input to classify unknown files in accordance with at least one of the embodiments as described herein and is accessible by, controlled by, and/or otherwise associated with, a security system provider. As used herein, a security system provider includes, but is not limited to, any party, person, application, system, or entity that desires to classify files as malicious or legitimate.

In one embodiment, security system provider computing system 150 is representative of two or more security system provider computing systems. In one embodiment, security system provider computing system 150 is a client computing system associated with one or more server computing systems. In one embodiment, security system provider computing system 150 is a server computing system that is, in turn, associated with one or more client computing systems that are users of one more security systems provided through, or monitored by, the security system provider associated with security system provider computing system 150. In one embodiment, security system provider computing system 150 is part of a cloud computing environment. A more detailed discussion of security system provider computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100 and/or security system provider computing system 150, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for employing user input to classify unknown files, and/or a provider of a security system and/or a security system provider computing system 150. In one embodiment, database 170 is part of a cloud computing environment.

In one embodiment, computing system(s) 100, security system provider computing system 150, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, security system provider computing system 150, and database 170, are coupled in a cloud computing environment.

Figure 2:
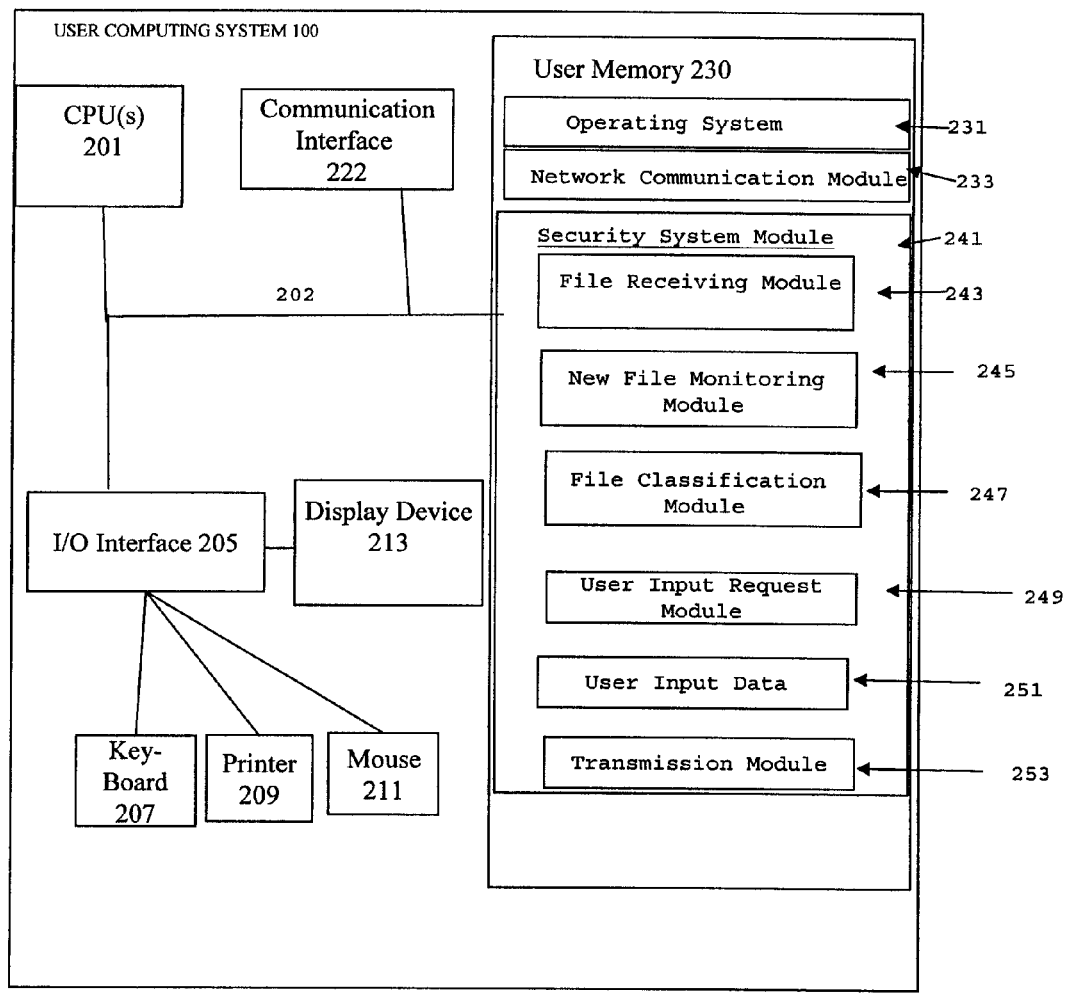
FIG. 2 is a block diagram of an exemplary user computing system of FIG. 1, in accordance with one embodiment.

FIG. 2 is a more detailed block diagram of an exemplary user computing system(s) 100. As seen in FIG. 2, in one embodiment, user computing system(s) 100 include(s) one of more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3): operating system 231 that includes procedures, data, and/or instructions for handling various services and performing/coordinating hardware dependent tasks; network communications module 233 that includes procedures, data, and/or instructions, for, along with communication interface 222, connecting user computing system(s) 100 to other computing systems, such as other user computing system(s) 100 and/or security system provider computing system 150 of FIG. 1, and/or a network, such as network 130 of FIG. 1, and/or a database, such as database 170 of FIG. 1; and security system module 241 (FIG. 2) that includes procedures, data, and/or instructions, for monitoring files downloaded onto user computing system(s) 100 and/or communicating with security system provider computing system 150 of FIG. 1 to identify malware and block the transfer/implementation of malware onto user computing system(s) 100 (FIG. 2).

As also seen in FIG. 2, in one embodiment, security system module 241 of user memory 230 includes: file receiving module 243 that includes procedures, data, and/or instructions for receiving files downloaded onto user computing system(s) 100 via communication interface 222 and/or security system provider computing system 150 of FIG. 1; new file monitoring module 245 that includes procedures, data, and/or instructions, for monitoring files downloaded onto user computing system(s) 100 and/or for communicating with security system provider computing system 150 of FIG. 1; file classification module 247 (FIG. 2) that includes procedures, data, and/or instructions, for classifying files as malicious or legitimate and/or for communicating with security system provider computing system 150 of FIG. 1; user input request module 249 (FIG. 2) that includes procedures, data, and/or instructions, for receiving requests from security system provider computing system 150 of FIG. 1 for user input regarding the legitimacy of a given unknown/unclassified file received at file receiving module 243 (FIG. 2); user input data 251 that includes data representing the user input regarding the legitimacy of a given unknown/unclassified file received at file receiving module 243; and transmission module 253 that includes procedures, data, and/or instructions, for transmitting user input data 251 to security system provider computing system 150 of FIG. 1.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and security system module 241 of user memory 230, is provided below with respect to FIG. 4.

Figure 3:
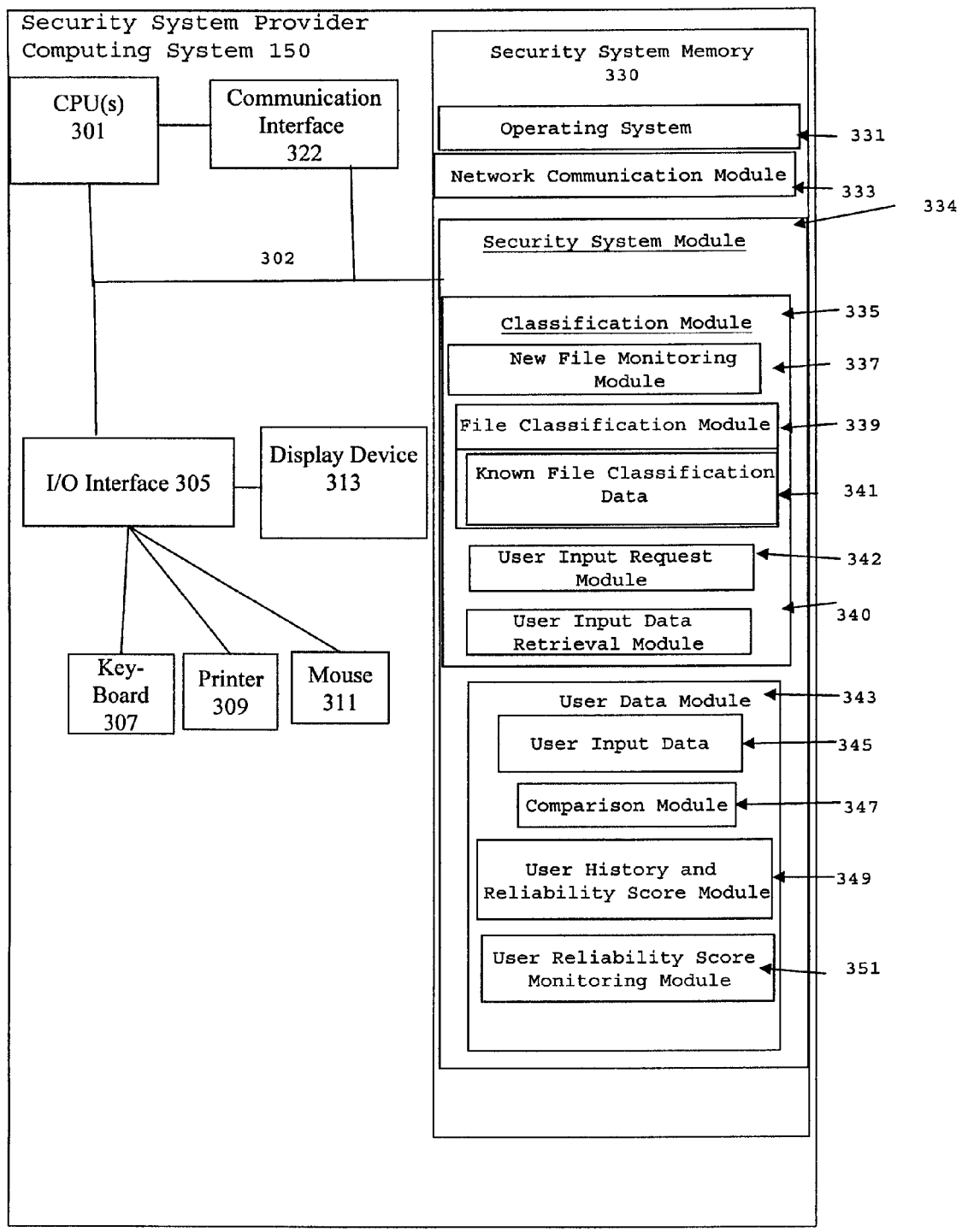
FIG. 3 is a block diagram of an exemplary security system provider computing system of FIG. 1, in accordance with one embodiment.

FIG. 3 is a more detailed block diagram of an exemplary security system provider computing system 150. As seen in FIG. 3, in one embodiment, security system provider computing system 150 includes one of more Central Processing Unit(s), CPU(s) 301; security system memory system 330; at least one communication interface 322; an Input/Output interface, I/O interface 305, including one or more user interface devices such as display device 313, keyboard 307, printer 309, and/or mouse 311; all interconnected by one or more communication buses 302

As also seen in FIG. 3, in one embodiment, security system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3): operating system 331 that includes procedures, data, and/or instructions for handling various services and performing/coordinating hardware dependent tasks; network communications module 333 that includes procedures, data, and/or instructions, for, along with communication interface 322, connecting security system provider computing system 150 to other computing systems, such as user computing system(s) 100 and/or another security system provider computing system, and/or a network, such as network 130 of FIG. 1, and/or a database, such as database 170 of FIG. 1; security system module 334 (FIG. 3) that includes procedures, data, and/or instructions, for monitoring files downloaded onto user computing system(s) 100 and/or communicating with user computing system(s) 100 of FIG. 1 to identify malware and block the transfer/implementation of malware onto user computing system(s) 100 (FIG. 2).

As also seen in FIG. 3, in one embodiment, security system module 334 of security system memory system 330 includes: classification module 335 that includes procedures, data, and/or instructions, for classifying files as malicious or legitimate and/or for communicating with computing system(s) 100 (FIG. 2); and user data module 343 that that includes procedures, data, and/or instructions associated with one or more users and for calculating, using, and/or monitoring one or more users' reliability scores using a processor, such as CPU(s) 201 (FIG. 2) and/or 301 (FIG. 3).

As also seen in FIG. 3, in one embodiment, classification module 335 includes: new file monitoring module 337 that includes procedures, data, and/or instructions, for monitoring files downloaded onto user computing system(s) 100 (FIG. 2) and/or for communicating with user computing system(s)

100; file classification module 339 that includes procedures, data, and/or instructions, for comparing a given file downloaded onto user computing system(s) 100 (FIG. 2) with known file classification data 341; user input request module 342 that includes procedures, data, and/or instructions, for requesting user input regarding the legitimacy of a given unknown/unclassified file detected at new file monitoring module 337 that could not be classified at file classification module 339 using known file classification data 341; and user input data retrieval module 340 that includes procedures, data, and/or instructions, for receiving user input data 251 (FIG. 2) from user transmission module 253.

As also seen in FIG. 3, in one embodiment, user data module 343 includes: user input data 345 that is received from user input data retrieval module 340 and includes data representing at least part of user input data 251 (FIG. 2); comparison module 347 (FIG. 3) that includes procedures, data, and/or instructions, associated with a comparison of the classification of a given unknown/unclassified file, as eventually determined via sources other than the given user's input, and the user input data 345 received from user input data retrieval module 340 including data representing at least part of user input data 251 (FIG. 2); user history and reliability score module 349 (FIG. 3) that includes procedures, data, and/or instructions, associated with the calculation of a given user's reliability score and classification of the given user as a source of data/input regarding the legitimacy of other unknown/unclassified files; and user reliability score monitoring module 351 that includes procedures, data, and/or instructions, associated with monitoring results of future comparisons of the given user's input regarding the legitimacy of the unknown/unclassified files and the eventual classification of the unknown/unclassified files to periodically update and transform the given user's reliability score.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary security system provider computing system 150, security system memory system 330, security system module 334 of security system memory system 330, and user data module 343 of security system memory system 330 is provided below with respect to FIG. 4.

Figure 4:
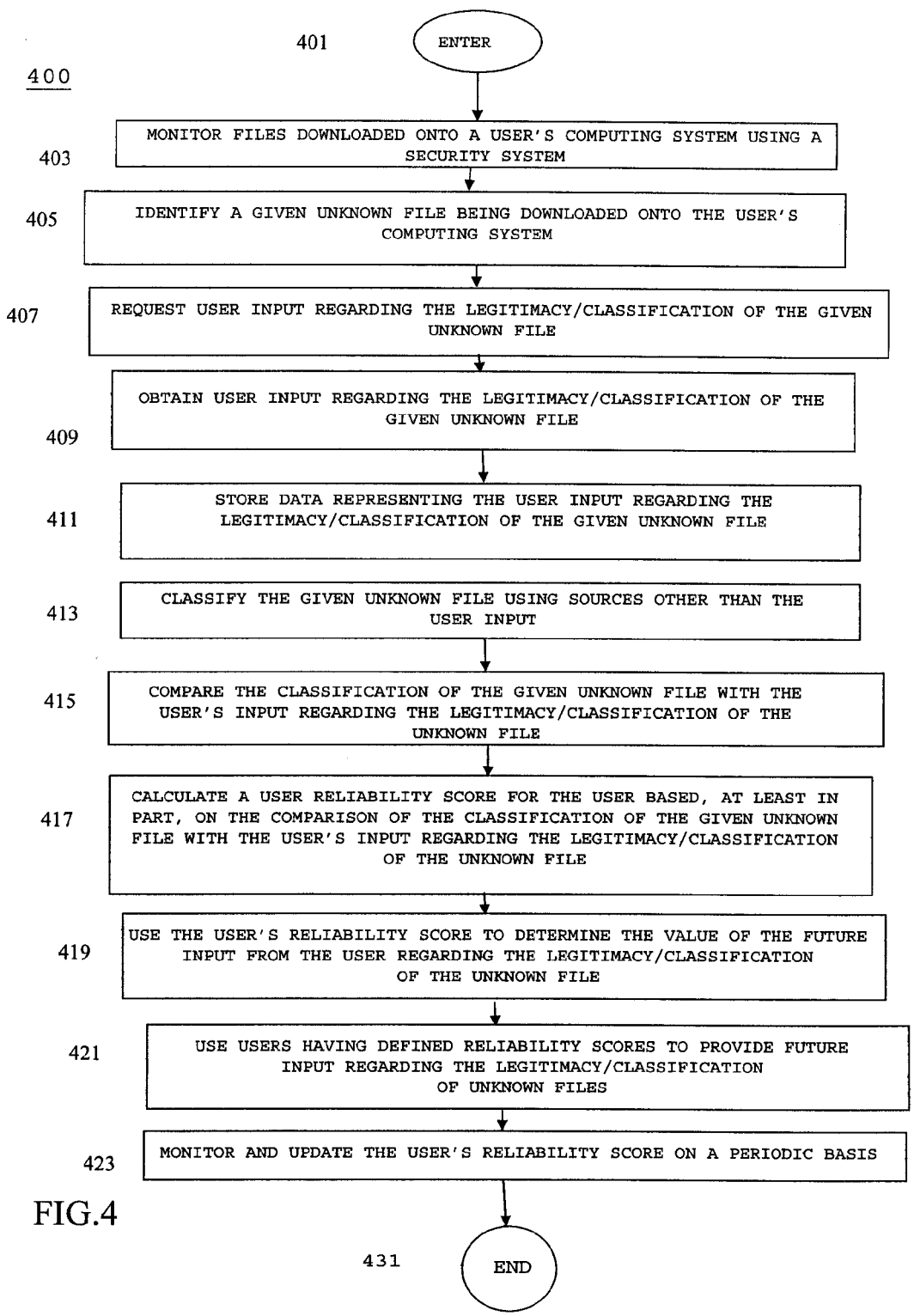
FIG. 4 is a flow chart depicting a process for employing user input to classify unknown files in accordance with one embodiment.

FIG. 4 is a flow chart depicting a process for employing user input to classify unknown files 400 in accordance with one embodiment. Process for employing user input to classify unknown files 400 begins at ENTER OPERATION 401 and process flow proceeds to MONITOR FILES DOWNLOADED ONTO A USER'S COMPUTING SYSTEM USING A SECURITY SYSTEM OPERATION 403.

In one embodiment, at MONITOR FILES DOWNLOADED ONTO A USER'S COMPUTING SYSTEM USING A SECURITY SYSTEM OPERATION 403 a security system is used to monitor files downloaded onto a given computing system, to identify malware, and to block the transfer of malware onto the given computing system.

In one embodiment, the security system of MONITOR FILES DOWNLOADED ONTO A USER'S COMPUTING SYSTEM USING A SECURITY SYSTEM OPERATION 403 is a software application, a software module, a hardware device, and/or a combination of software and hardware, implemented, in whole or in part: on a given user's computing system, such as user computing system(s) 100 of FIGS. 1 and 2; on a security system provider's computing system, such as security system provider computing system 150 of FIGS. 1 and 3; a third party computing system; a server computing system; or any combination of a given user's computing system, a security system provider's computing system, a server computing system, and/or a third party computing system.

Returning to FIG. 4, in some embodiments, at least part of the data and/or code associated with the security system of MONITOR FILES DOWNLOADED ONTO A USER'S COMPUTING SYSTEM USING A SECURITY SYSTEM OPERATION 403 resides on the user computing system, such as user computing system(s) 100 of FIGS. 1 and 2. As noted above, in some embodiments, a user computing system includes a user memory system, such as user memory 230 (FIG. 2) that can store data and/or instructions associated with, but not limited to, a security system in a security system module, such as security system module 241 (FIG. 2) that includes procedures, data, and/or instructions, used by one or more processors, such as CPU(s) 201 (FIG. 2) and CPU(s) 301 (FIG. 3), for monitoring files downloaded onto the user computing system, such as user computing system(s) 100, and/or communicating with a security system provider computing system, such as security system provider computing system 150, of FIG. 1 to identify malware and block the transfer/implementation of malware onto user computing system(s) 100 (FIG. 2).

Returning to FIG. 2, in some embodiments, the security system module, such security system module 241 of user memory 230 includes a file receiving module, such as file receiving module 243 of FIG. 2, that includes procedures, data, and/or instructions used by one or more processors, such as CPU(s) 201 (FIG. 2) and CPU(s) 301 (FIG. 3) for receiving files downloaded onto user computing system(s) 100 via communication interface 222 and/or security system provider computing system 150 of FIG. 1.

Returning to FIG. 2, in some embodiments, the security system module, such security system module 241 of user memory 230 of FIG. 2, includes a new file monitoring module, such as new file monitoring module 245 that includes procedures, data, and/or instructions, used by one or more processors, such as CPU(s) 201 (FIG. 2) and CPU(s) 301 (FIG. 3), for monitoring files downloaded onto user computing system(s) 100 and/or for communicating with security system provider computing system 150 of FIG. 1.

Returning to FIG. 4, in some embodiments, at least part of the data and/or code associated with the security system of MONITOR FILES DOWNLOADED ONTO A USER'S COMPUTING SYSTEM USING A SECURITY SYSTEM OPERATION 403 resides on a security system provider computing system, such as security system provider computing system 150 of FIGS. 1 and 3. As noted above, in some embodiments, the security system provider computing system includes a security system memory system, such as security system memory system 330 (FIG. 3), that can store data and/or instructions associated with, but not limited to, the security system of MONITOR FILES DOWNLOADED ONTO A USER'S COMPUTING SYSTEM USING A SECURITY SYSTEM OPERATION 403 in a security system module, such as security system module 334 (FIG. 3), that includes procedures, data, and/or instructions, used by one or more processors, such as CPU(s) 201 (FIG. 2) and CPU(s) 301 (FIG. 3), for monitoring files downloaded onto user computing system(s) 100 and/or communicating with user computing system(s) 100 of FIG. 1 to identify malware and block the transfer/implementation of malware onto user computing system(s) 100 (FIG. 2).

Returning to FIG. 3, as also discussed above, in one embodiment, security system module 334 of security system memory system 330 includes a classification module, such as classification module 335 of FIG. 3, that includes a new file monitoring module, such as new file monitoring module 337, that includes procedures, data, and/or instructions, used by one or more processors, such as CPU(s) 201 (FIG. 2) and CPU(s) 301 (FIG. 3), for monitoring files downloaded onto user computing system(s) 100 (FIG. 2) and/or for communicating with user computing system(s) 100.

Returning to FIG. 4, in some embodiments, any given new file being downloaded and/or executed on a given user computing system, such as user computing system(s) 100 of FIG. 2, is monitored and/or held/buffered and/or quarantined while an attempt is made to classify the given new file as malicious or legitimate. In some embodiments, the given new file is held/buffered on the security system provider computing system, or in another location under the control of the security system provider computing system, while an attempt is made to classify the given new file as malicious or legitimate before the given new file is transferred to the given user computing system. In other embodiments, the given new file is held/buffered and/or quarantined in a designated portion of a memory device, or other subsystem, that is part of, or is otherwise associated with, the user computing system before the given new file is transferred and/or executed on user computing system.

Returning to FIG. 4, in one embodiment, once a security system is used to monitor files downloaded onto a given computing system, to identify malware, and to block the transfer of malware onto the given computing system at MONITOR FILES DOWNLOADED ONTO A USER'S COMPUTING SYSTEM USING A SECURITY SYSTEM OPERATION 403, process flow proceeds to IDENTIFY A GIVEN UNKNOWN FILE BEING DOWNLOADED ONTO THE USER'S COMPUTING SYSTEM OPERATION 405.

In one embodiment, at IDENTIFY A GIVEN UNKNOWN FILE BEING DOWNLOADED ONTO THE USER'S COMPUTING SYSTEM OPERATION 405 when the security system of MONITOR FILES DOWNLOADED ONTO A USER'S COMPUTING SYSTEM USING A SECURITY SYSTEM OPERATION 403 detects a given new file is downloaded and/or activated on the given computing system, the security system attempts to classify the given file as a malicious or legitimate file based on known files and known file characteristics. In one embodiment, if the given new file cannot be classified by the security system, the given file is designated as a given unknown/unclassified file.

In some embodiments, the attempt to classify the given new file as a malicious or legitimate file based on known files and known file characteristics is performed locally on the user computing system, such as user computing system(s) 100 of FIG. 1. As noted above, in some embodiments, a user computing system includes a user memory system, such as user memory 230 (FIG. 2) that can store data and/or instructions associated with, but not limited to, a security system in a security system module, such as security system module 241 (FIG. 2) that includes a file classification module, such as file classification module 247 (FIG. 2). In some embodiments, file classification module 247 (FIG. 2) includes procedures, data, and/or instructions, used by one or more processors, such as CPU(s) 201 (FIG. 2) and CPU(s) 301 (FIG. 3), for classifying files as malicious or legitimate and/or for communicating with security system provider computing system 150 of FIG. 1.

Returning to FIG. 4, in one embodiment, the attempt to classify the given new file as a malicious or legitimate file based on known files and known file characteristics is performed remotely on a security system provider computing system, such as security system provider computing system 150 of FIG. 3. As noted above, in some embodiments, security system module 334 of security system memory system 330 includes a classification module, such as classification module 335 of FIG. 3, which includes procedures, data, and/or instructions, for comparing a given new file with known file classification data 341.

Returning to FIG. 4, in one embodiment, if at IDENTIFY A GIVEN UNKNOWN FILE BEING DOWNLOADED ONTO THE USER'S COMPUTING SYSTEM OPERATION 405 the given new file cannot be classified using known file classification data, i.e., the given new file does not a known file and does not have one or more characteristics associated with either known malicious files or known legitimate files, the given file is designated/identified as a given unknown/unclassified file.

In one embodiment, once the security system of MONITOR FILES DOWNLOADED ONTO A USER'S COMPUTING SYSTEM USING A SECURITY SYSTEM OPERATION 403 fails to classify the given new file as a malicious or legitimate file based on known files and known file characteristics and the given new file is designated as a given unknown/unclassified file at IDENTIFY A GIVEN UNKNOWN FILE BEING DOWNLOADED ONTO THE USER'S COMPUTING SYSTEM OPERATION 405, process flow proceeds to REQUEST USER INPUT REGARDING THE LEGITIMACY/CLASSIFICATION OF THE GIVEN UNKNOWN FILE OPERATION 407.

In one embodiment, at REQUEST USER INPUT REGARDING THE LEGITIMACY/CLASSIFICATION OF THE GIVEN UNKNOWN FILE OPERATION 407 once the given file is designated as a given unknown/unclassified file by the security system at IDENTIFY A GIVEN UNKNOWN FILE BEING DOWNLOADED ONTO THE USER'S COMPUTING SYSTEM OPERATION 405, a given user associated with the given computing system is contacted and asked to provide input regarding the legitimacy of the given unknown/unclassified file.

In one embodiment, a user input request is generated at a security system provider computing system, such as security system provider computing system 150 of FIGS. 1 and 3.

Referring to FIG. 3, as noted above, in one embodiment, file classification module 339 of security system memory 330 includes user input request module 342 that includes procedures, data, and/or instructions, used by one or more processors, such as CPU(s) 201 (FIG. 2) and CPU(s) 301 (FIG. 3), for requesting user input regarding the legitimacy of a given unknown/unclassified file detected at new file monitoring module 337 that could not be classified at file classification module 339 using known file classification data 341.

Returning to FIG. 4, in one embodiment, the user input request is generated at a security system provider computing system and then transferred to a user computing system, such as user computing system(s) 100 of FIG. 1, using: a network communication module in the security system memory, such as network communication module 333 of security system memory 330 of security system provider computing system 150 of FIG. 3; a communication interface of the security system provider computing system, such as communication interface 322 of FIGS. 1 and 3; a network, such as network 130 of FIG. 1; a communication interface of the user computing system, such as communication interface 222 of FIGS. 1 and 2; a network communication module in the user computing system, such as network communication module 233 of user memory 230 (FIG. 2); and a user input request module, such as user input request module 249 of user memory 230 of FIG. 2.

Returning to FIG. 4, in one embodiment, input regarding the legitimacy of the given unknown/unclassified file requested of the given user at Request User Input Regarding the LEGITIMACY/CLASSIFICATION OF THE GIVEN UNKNOWN FILE OPERATION 407 is a request for the user to indicate if the given unknown/unclassified file was explicitly obtained/requested by the given user and/or if the given unknown/unclassified file is desired by the given user.

In one embodiment, at REQUEST USER INPUT REGARDING THE LEGITIMACY/CLASSIFICATION OF THE GIVEN UNKNOWN FILE OPERATION 407 the given user is asked to classify the given unknown/unclassified file as legitimate or malicious, and/or as a requested, or an unrequested file, and/or as being from a known/trusted source or from an unknown source.

In various other embodiments, the input regarding the legitimacy of the given unknown/unclassified file requested of the given user at REQUEST USER INPUT REGARDING THE LEGITIMACY/CLASSIFICATION OF THE GIVEN UNKNOWN FILE OPERATION 407 is a request made to the given user for any information about the given unknown/unclassified file desired by the provider of the security system of MONITOR FILES DOWNLOADED ONTO A USER'S COMPUTING SYSTEM USING A SECURITY SYSTEM OPERATION 403 and/or the provider of process for employing user input to classify unknown files 400.

Returning to FIG. 4, in one embodiment, once a given user associated with the given computing system is contacted and asked to provide input regarding the legitimacy of the given unknown/unclassified file at REQUEST USER INPUT REGARDING THE LEGITIMACY/CLASSIFICATION OF THE GIVEN UNKNOWN FILE OPERATION 407, process flow proceeds to OBTAIN USER INPUT REGARDING THE LEGITIMACY/CLASSIFICATION OF THE GIVEN UNKNOWN FILE OPERATION 409.

In one embodiment, at OBTAIN USER INPUT REGARDING THE LEGITIMACY/CLASSIFICATION OF THE GIVEN UNKNOWN FILE OPERATION 409 the requested given user input regarding the legitimacy of the given unknown/unclassified file of REQUEST USER INPUT REGARDING THE LEGITIMACY/CLASSIFICATION OF THE GIVEN UNKNOWN FILE OPERATION 407 is submitted by the given user as data, in one embodiment via a user input/output interface and/or a user interface device, and a memory associated with the given computing system.

In one embodiment, at OBTAIN USER INPUT REGARDING THE LEGITIMACY/CLASSIFICATION OF THE GIVEN UNKNOWN FILE OPERATION 409 the requested given user input regarding the legitimacy of the given unknown/unclassified file of REQUEST USER INPUT REGARDING THE LEGITIMACY/CLASSIFICATION OF THE GIVEN UNKNOWN FILE OPERATION 407 is submitted by the given user as data, in one embodiment via a user input/output interface, such as input/output interface 205 of user computing system(s) 100 of FIG. 2, and/or a user interface device, such as keyboard 207 and/or mouse 211 of FIG. 2, voice recognition software, a touch screen, a touch pad, and/or any other device and/or system for converting one or more user actions into computing system based instructions as discussed herein, and/or as known in the art at the time of filing, and/or as developed after the time of filing.

Returning to FIG. 4, in one embodiment, at OBTAIN USER INPUT REGARDING THE LEGITIMACY/CLASSIFICATION OF THE GIVEN UNKNOWN FILE OPERATION 409 the requested given user input regarding the legitimacy of the given unknown/unclassified file of REQUEST USER INPUT REGARDING THE LEGITIMACY/CLASSIFICATION OF THE GIVEN UNKNOWN FILE OPERATION 407 is stored on the user computing system memory system, such as user input data 251 of user memory 230 of user computing system(s) 100 of FIG. 2.

Returning to FIG. 4, in one embodiment, at OBTAIN USER INPUT REGARDING THE LEGITIMACY/CLASSIFICATION OF THE GIVEN UNKNOWN FILE OPERATION 409 the requested given user input regarding the legitimacy of the given unknown/unclassified file of REQUEST USER INPUT REGARDING THE LEGITIMACY/CLASSIFICATION OF THE GIVEN UNKNOWN FILE OPERATION 407, such as user input data 251 of user memory 230 of user computing system(s) 100 of FIG. 2, is transferred to a security system provider computing system, such as security system provider computing system 150 of FIG. 3 using: a network communication module in the user computing system, such as network communication module 233 of user memory 230 (FIG. 2); a communication interface of the user computing system, such as communication interface 222 of FIGS. 1 and 2; a network, such as network 130 of FIG. 1; a communication interface of the security system provider computing system, such as communication interface 322 of FIGS. 1 and 3; a network communication module in the security system memory, such as network communication module 333 of security system memory 330 of security system provider computing system 150 of FIG. 3; and a user input data retrieval module, such as user input data retrieval module 340 of classification module 335 of security system memory 330 of security system provider computing system 150 of FIG. 3.

Returning to FIG. 4, in one embodiment, the data representing the requested given user input regarding the legitimacy of the given unknown/unclassified file of REQUEST USER INPUT REGARDING THE LEGITIMACY/CLASSIFICATION OF THE GIVEN UNKNOWN FILE OPERATION 407 is used to transform the status of the given unknown/unclassified file to the status of a user classified file, such as either a user classified malicious file or a user classified legitimate file.

Returning to FIG. 4, in one embodiment, once the requested given user input regarding the legitimacy of the given unknown/unclassified file of REQUEST USER INPUT REGARDING THE LEGITIMACY/CLASSIFICATION OF THE GIVEN UNKNOWN FILE OPERATION 407 is submitted by the given user at OBTAIN USER INPUT REGARDING THE LEGITIMACY/CLASSIFICATION OF THE GIVEN UNKNOWN FILE OPERATION 409, process flow proceeds to STORE DATA REPRESENTING THE USER INPUT REGARDING THE LEGITIMACY/CLASSIFICATION OF THE GIVEN UNKNOWN FILE OPERATION 411.

In one embodiment, at STORE DATA REPRESENTING THE USER INPUT REGARDING THE LEGITIMACY/CLASSIFICATION OF THE GIVEN UNKNOWN FILE OPERATION 411 the data representing the requested given user input regarding the legitimacy of the given unknown/unclassified file of REQUEST USER INPUT REGARDING THE LEGITIMACY/CLASSIFICATION OF THE GIVEN UNKNOWN FILE OPERATION 407 is stored in the security system provider computing system memory in a memory location/file associated with the given user and/or the given unknown/unclassified file, or in another memory device and/or database, under the control of, and/or otherwise associated with, the security system provider computing system memory and/or process for employing user input to classify unknown files 400.

In one embodiment, at STORE DATA REPRESENTING THE USER INPUT REGARDING THE LEGITIMACY/CLASSIFICATION OF THE GIVEN UNKNOWN FILE OPERATION 411 the data representing the requested given user input regarding the legitimacy of the given unknown/unclassified file of REQUEST USER INPUT REGARDING THE LEGITIMACY/CLASSIFICATION OF THE GIVEN UNKNOWN FILE OPERATION 407 is stored in a user data module, such as user input data 345 in user data module 343 of security system module 335 of security system memory 330 of security system provider computing system 150 of FIG. 3.

Returning to FIG. 4, in other embodiments, the data representing the requested given user input regarding the legitimacy of the given unknown/unclassified file is stored, in whole, or in part, in any memory system, such as a user memory systems, or server memory system, or a database, such as database 170, of FIG. 1, or in a cache memory, or in any main memory or mass memory, associated with any computing system. In one embodiment, the data representing the requested given user input regarding the legitimacy of the given unknown/unclassified file is stored, in whole, or in part, in any computing system and/or server system, or other device, in another location, or on/in a computer readable medium, and/or any other computer program product. In one embodiment, at least part of the data representing the requested given user input regarding the legitimacy of the given unknown/unclassified file is stored, in whole, or in part, on a webpage, in a web-based system on a network such as network 130 of FIG. 1. In one embodiment, at least part of the data representing the requested given user input regarding the legitimacy of the given unknown/unclassified file is stored, in whole, or in part, on a webpage, in a web-based system on a public network such as the Internet.

Returning to FIG. 4, in one embodiment, once the data representing the requested given user input regarding the legitimacy of the given unknown/unclassified file of REQUEST USER INPUT REGARDING THE LEGITIMACY/CLASSIFICATION OF THE GIVEN UNKNOWN FILE OPERATION 407 is stored at STORE DATA REPRESENTING THE USER INPUT REGARDING THE LEGITIMACY/CLASSIFICATION OF THE GIVEN UNKNOWN FILE OPERATION 411, process flow proceeds to CLASSIFY THE GIVEN UNKNOWN FILE USING SOURCES OTHER THAN THE USER INPUT OPERATION 413.

In one embodiment, at CLASSIFY THE GIVEN UNKNOWN FILE USING SOURCES OTHER THAN THE USER INPUT OPERATION 413, the classification of the given unknown/unclassified file of IDENTIFY A GIVEN UNKNOWN FILE BEING DOWNLOADED ONTO THE USER'S COMPUTING SYSTEM OPERATION 405 is determined using any one of several sources other than the given user input regarding the legitimacy of the given unknown/unclassified file of OBTAIN USER INPUT REGARDING THE LEGITIMACY/CLASSIFICATION OF THE GIVEN UNKNOWN FILE OPERATION 409.

In one embodiment, at CLASSIFY THE GIVEN UNKNOWN FILE USING SOURCES OTHER THAN THE USER INPUT OPERATION 413, the classification of the given unknown/unclassified file of IDENTIFY A GIVEN UNKNOWN FILE BEING DOWNLOADED ONTO THE USER'S COMPUTING SYSTEM OPERATION 405 is determined by further analysis of the given unknown/unclassified file of IDENTIFY A GIVEN UNKNOWN FILE BEING DOWNLOADED ONTO THE USER'S COMPUTING SYSTEM OPERATION 405 by the security system of MONITOR FILES DOWNLOADED ONTO A USER'S COMPUTING SYSTEM USING A SECURITY SYSTEM OPERATION 403 and/or security system provider. As an example, in cases where the given unknown/unclassified file of IDENTIFY A GIVEN UNKNOWN FILE BEING DOWNLOADED ONTO THE USER'S COMPUTING SYSTEM OPERATION 405 is a new, or rare, type of file, the provider of the security system may need time to devote resources to determining the nature and/or classification of the given unknown/unclassified file. Once given the sufficient time and/or resources, a classification of the given unknown/unclassified file is then eventually determined.

In one embodiment, at CLASSIFY THE GIVEN UNKNOWN FILE USING SOURCES OTHER THAN THE USER INPUT OPERATION 413, the classification of the given unknown/unclassified file of IDENTIFY A GIVEN UNKNOWN FILE BEING DOWNLOADED ONTO THE USER'S COMPUTING SYSTEM OPERATION 405 is determined by input from other users. As a specific example, in one embodiment, the classification of the given unknown/unclassified file is obtained form multiple users input and, in some instances, from input transformed into weighted and/or filtered user input data using process for employing user input to classify unknown files 400, as discussed in more detail below.

In one embodiment, at CLASSIFY THE GIVEN UNKNOWN FILE USING SOURCES OTHER THAN THE USER INPUT OPERATION 413, the classification of the given unknown/unclassified file of IDENTIFY A GIVEN UNKNOWN FILE BEING DOWNLOADED ONTO THE USER'S COMPUTING SYSTEM OPERATION 405 is determined by analysis of the given unknown/unclassified file by other parties, such as another security system, a government agency, a watchdog group, or any other entity considered to be an authority by the provider of process for employing user input to classify unknown files 400.

In one embodiment, at CLASSIFY THE GIVEN UNKNOWN FILE USING SOURCES OTHER THAN THE USER INPUT OPERATION 413, the classification of the given unknown/unclassified file of IDENTIFY A GIVEN UNKNOWN FILE BEING DOWNLOADED ONTO THE USER'S COMPUTING SYSTEM OPERATION 405 is determined by other events associated with the given unknown/unclassified file. For instance, the given unknown/unclassified file may be determined to be malicious by virtue of its negative effect on various computing systems as reported by other users and/or in the press.

In various other embodiments, at CLASSIFY THE GIVEN UNKNOWN FILE USING SOURCES OTHER THAN THE USER INPUT OPERATION 413, the classification of the given unknown/unclassified file of IDENTIFY A GIVEN UNKNOWN FILE BEING DOWNLOADED ONTO THE USER'S COMPUTING SYSTEM OPERATION 405 is determined by any means considered acceptable to the provider of process for employing user input to classify unknown files 400 and/or the provider of the security system of MONITOR FILES DOWNLOADED ONTO A USER'S COMPUTING SYSTEM USING A SECURITY SYSTEM OPERATION 403, other than the input of OBTAIN USER INPUT REGARDING THE LEGITIMACY/CLASSIFICATION OF THE GIVEN UNKNOWN FILE OPERATION 409 obtained from the given user.

In one embodiment, once the classification of the given unknown/unclassified file of IDENTIFY A GIVEN UNKNOWN FILE BEING DOWNLOADED ONTO THE USER'S COMPUTING SYSTEM OPERATION 405 is determined by any one of several sources other than the given user input regarding the legitimacy of the given unknown/unclassified file of OBTAIN USER INPUT REGARDING THE LEGITIMACY/CLASSIFICATION OF THE GIVEN UNKNOWN FILE OPERATION 409, the data representing the now known/classified given file and/or data representing one or more characteristics of the now known/classified given file is added to known file classification data, such as known file classification data 341 of classification module 335 of security system memory 330 of security system provider computing system 150 of FIG. 3.

Returning to FIG. 4, in one embodiment, once the classification of the given unknown/unclassified file of IDENTIFY A GIVEN UNKNOWN FILE BEING DOWNLOADED ONTO THE USER'S COMPUTING SYSTEM OPERATION 405 is determined by any one of several sources other than the given user input regarding the legitimacy of the given unknown/unclassified file of OBTAIN USER INPUT REGARDING THE LEGITIMACY/CLASSIFICATION OF THE GIVEN UNKNOWN FILE OPERATION 409 at CLASSIFY THE GIVEN UNKNOWN FILE USING SOURCES OTHER THAN THE USER INPUT OPERATION 413, process flow proceeds to COMPARE THE CLASSIFICATION OF THE GIVEN UNKNOWN FILE WITH THE USER'S INPUT REGARDING THE LEGITIMACY/CLASSIFICATION OF THE UNKNOWN FILE OPERATION 415.

In one embodiment, at COMPARE THE CLASSIFICATION OF THE GIVEN UNKNOWN FILE WITH THE USER'S INPUT REGARDING THE LEGITIMACY/CLASSIFICATION OF THE UNKNOWN FILE OPERATION 415 data representing the classification of the given unknown/unclassified file determined at CLASSIFY THE GIVEN UNKNOWN FILE USING SOURCES OTHER THAN THE USER INPUT OPERATION 413 is compared with the given user's input regarding the legitimacy of the given unknown/unclassified file of STORE DATA REPRESENTING THE USER INPUT REGARDING THE LEGITIMACY/CLASSIFICATION OF THE GIVEN UNKNOWN FILE OPERATION 411 to determine the accuracy of the given user's input regarding the legitimacy of the given unknown/unclassified file of OBTAIN USER INPUT REGARDING THE LEGITIMACY/CLASSIFICATION OF THE GIVEN UNKNOWN FILE OPERATION 409.

As noted above, in one embodiment, data representing the classification of the given unknown/unclassified file determined at CLASSIFY THE GIVEN UNKNOWN FILE USING SOURCES OTHER THAN THE USER INPUT OPERATION 413 is added to and stored as part of known file classification data 341 in classification module 335 of security system module 334 of security system memory 330 of security system provider computing system 150 of FIG. 3, and data representing the given user's input regarding the legitimacy of the given unknown/unclassified file of OBTAIN USER INPUT REGARDING THE LEGITIMACY/CLASSIFICATION OF THE GIVEN UNKNOWN FILE OPERATION 409 is stored as user input data 345 of user data module 343 of security system module 334 of security system memory 330 of security system provider computing system 150 of FIG. 3.

In one embodiment at COMPARE THE CLASSIFICATION OF THE GIVEN UNKNOWN FILE WITH THE USER'S INPUT REGARDING THE LEGITIMACY/CLASSIFICATION OF THE UNKNOWN FILE OPERATION 415 a processor, such as CPU(s) 301, of security system provider computing system 150 compares the data representing the classification of the given unknown/unclassified file of CLASSIFY THE GIVEN UNKNOWN FILE USING SOURCES OTHER THAN THE USER INPUT OPERATION 413 and data representing the given user's input regarding the legitimacy of the given unknown/unclassified file of OBTAIN USER INPUT REGARDING THE LEGITIMACY/CLASSIFICATION OF THE GIVEN UNKNOWN FILE OPERATION 409. In one embodiment at COMPARE THE CLASSIFICATION OF THE GIVEN UNKNOWN FILE WITH THE USER'S INPUT REGARDING THE LEGITIMACY/CLASSIFICATION OF THE UNKNOWN FILE OPERATION 415 data representing the results of the comparison is stored in comparison module 347 of user data module 343 of security system module 334 of security system memory 330 of security system provider computing system 150 of FIG. 3.

Returning to FIG. 4, in one embodiment, COMPARE THE CLASSIFICATION OF THE GIVEN UNKNOWN FILE WITH THE USER'S INPUT REGARDING THE LEGITIMACY/CLASSIFICATION OF THE UNKNOWN FILE OPERATION 415, the data of OBTAIN USER INPUT REGARDING THE LEGITIMACY/CLASSIFICATION OF THE GIVEN UNKNOWN FILE OPERATION 409 is compared with the data of CLASSIFY THE GIVEN UNKNOWN FILE USING SOURCES OTHER THAN THE USER INPUT OPERATION 413 to determine if the given user correctly classified the given unknown/unclassified file at OBTAIN USER INPUT REGARDING THE LEGITIMACY/CLASSIFICATION OF THE GIVEN UNKNOWN FILE OPERATION 409.

In one embodiment, once data representing the classification of the given unknown/unclassified file determined at CLASSIFY THE GIVEN UNKNOWN FILE USING SOURCES OTHER THAN THE USER INPUT OPERATION 413 is compared with data representing the given user's input regarding the legitimacy of the given unknown/unclassified file of STORE DATA REPRESENTING THE USER INPUT REGARDING THE LEGITIMACY/CLASSIFICATION OF THE GIVEN UNKNOWN FILE OPERATION 411 to determine the accuracy of the given user's input regarding the legitimacy of the given unknown/unclassified file at COMPARE THE CLASSIFICATION OF THE GIVEN UNKNOWN FILE WITH THE USER'S INPUT REGARDING THE LEGITIMACY/CLASSIFICATION OF THE UNKNOWN FILE OPERATION 415, process flow proceeds to CALCULATE A USER RELIABILITY SCORE FOR THE USER BASED, AT LEAST IN PART, ON THE COMPARISON OF THE CLASSIFICATION OF THE GIVEN UNKNOWN FILE WITH THE USER'S INPUT REGARDING THE LEGITIMACY/CLASSIFICATION OF THE UNKNOWN FILE OPERATION 417.

In one embodiment, at CALCULATE A USER RELIABILITY SCORE FOR THE USER BASED, AT LEAST IN PART, ON THE COMPARISON OF THE CLASSIFICATION OF THE GIVEN UNKNOWN FILE WITH THE USER'S INPUT REGARDING THE LEGITIMACY/CLASSIFICATION OF THE UNKNOWN FILE OPERATION 417 the results of the comparison of COMPARE THE CLASSIFICATION OF THE GIVEN UNKNOWN FILE WITH THE USER'S INPUT REGARDING THE LEGITIMACY/CLASSIFICATION OF THE UNKNOWN FILE OPERATION 415 between the given user's input regarding the legitimacy of the given unknown/unclassified file of OBTAIN USER INPUT REGARDING THE LEGITIMACY/CLASSIFICATION OF THE GIVEN UNKNOWN FILE OPERATION 409 and the determined classification of the given unknown/unclassified file based on other sources of CLASSIFY THE GIVEN UNKNOWN FILE USING SOURCES OTHER THAN THE USER INPUT OPERATION 413 is used to calculate, and/or transform, a reliability score to be associated with the given user.

In one embodiment, at CALCULATE A USER RELIABILITY SCORE FOR THE USER BASED, AT LEAST IN PART, ON THE COMPARISON OF THE CLASSIFICATION OF THE GIVEN UNKNOWN FILE WITH THE USER'S INPUT REGARDING THE LEGITIMACY/CLASSIFICATION OF THE UNKNOWN FILE OPERATION 417 the results of the comparison of COMPARE THE CLASSIFICATION OF THE GIVEN UNKNOWN FILE WITH THE USER'S INPUT REGARDING THE LEGITIMACY/CLASSIFICATION OF THE UNKNOWN FILE OPERATION 415 between the given user's input regarding the legitimacy of the given unknown/unclassified file of OBTAIN USER INPUT REGARDING THE LEGITIMACY/CLASSIFICATION OF THE GIVEN UNKNOWN FILE OPERATION 409 and the determined classification of the given unknown/unclassified file based on other sources of CLASSIFY THE GIVEN UNKNOWN FILE USING SOURCES OTHER THAN THE USER INPUT OPERATION 413 is used, along with other comparisons of the given user's input regarding the legitimacy of the other unknown/unclassified files and the classification of the other unknown/unclassified files based on other sources, to calculate, and/or transform, a reliability score to be associated with the given user.

In some embodiments, a given user's reliability score is calculated based, at least in part, on the number of correct, or incorrect, classifications by the user, i.e., instances the given user's input regarding the legitimacy of unknown/unclassified files corresponds, or fails to correspond, to the classification of the unknown/unclassified files based on other data from other sources.

In some embodiments, a given user's reliability score is a ratio of number of instances the given user's input regarding the legitimacy of unknown/unclassified files corresponds to the classification of the unknown/unclassified files based on other sources to the number of instances the given user's input regarding the legitimacy of unknown/unclassified files does not correspond to the classification of the unknown/unclassified files based on other sources.

In other embodiments, a given user's reliability score is calculated by any method and/or means desired by the provider of process for employing user input to classify unknown files 400 and/or the provider of the security system of MONITOR FILES DOWNLOADED ONTO A USER'S COMPUTING SYSTEM USING A SECURITY SYSTEM OPERATION 403.

In some embodiments, once a given user's reliability score is calculated and/or transformed at CALCULATE A USER RELIABILITY SCORE FOR THE USER BASED, AT LEAST IN PART, ON THE COMPARISON OF THE CLASSIFICATION OF THE GIVEN UNKNOWN FILE WITH THE USER'S INPUT REGARDING THE LEGITIMACY/CLASSIFICATION OF THE UNKNOWN FILE OPERATION 417, data representing the given user's reliability score is stored in a user history and reliability score module, such as user history and reliability score module 349 of user data module 343 of security system module 334 of security system memory 330 of security system provider computing system 150 of FIG. 3.

Returning to FIG. 4, in one embodiment, once the results of the comparison of COMPARE THE CLASSIFICATION OF THE GIVEN UNKNOWN FILE WITH THE USER'S INPUT REGARDING THE LEGITIMACY/CLASSIFICATION OF THE UNKNOWN FILE OPERATION 415 between the given user's input regarding the legitimacy of the given unknown/unclassified file of OBTAIN USER INPUT REGARDING THE LEGITIMACY/CLASSIFICATION OF THE GIVEN UNKNOWN FILE OPERATION 409 and the determined classification of the given unknown/unclassified file based on other sources of CLASSIFY THE GIVEN UNKNOWN FILE USING SOURCES OTHER THAN THE USER INPUT OPERATION 413 is used to calculate, and/or transform, a reliability score to be associated with the given user at CALCULATE A USER RELIABILITY SCORE FOR THE USER BASED, AT LEAST IN PART, ON THE COMPARISON OF THE CLASSIFICATION OF THE GIVEN UNKNOWN FILE WITH THE USER'S INPUT REGARDING THE LEGITIMACY/CLASSIFICATION OF THE UNKNOWN FILE OPERATION 417, process flow proceeds to USE THE USER'S RELIABILITY SCORE TO DETERMINE THE VALUE OF THE FUTURE INPUT FROM THE USER REGARDING THE LEGITIMACY/CLASSIFICATION OF THE UNKNOWN FILE OPERATION 419.

In one embodiment, at USE THE USER'S RELIABILITY SCORE TO DETERMINE THE VALUE OF THE FUTURE INPUT FROM THE USER REGARDING THE LEGITIMACY/CLASSIFICATION OF THE UNKNOWN FILE OPERATION 419 the given user's reliability score of CALCULATE A USER RELIABILITY SCORE FOR THE USER BASED, AT LEAST IN PART, ON THE COMPARISON OF THE CLASSIFICATION OF THE GIVEN UNKNOWN FILE WITH THE USER'S INPUT REGARDING THE LEGITIMACY/CLASSIFICATION OF THE UNKNOWN FILE OPERATION 417 is used to classify the given user as a source of data/input regarding the legitimacy of other unknown/unclassified files; thereby transforming a status of the given user as a source of data/input regarding the legitimacy of other unknown/unclassified files.

For instance, in one embodiment, at USE THE USER'S RELIABILITY SCORE TO DETERMINE THE VALUE OF THE FUTURE INPUT FROM THE USER REGARDING THE LEGITIMACY/CLASSIFICATION OF THE UNKNOWN FILE OPERATION 419, the given user's reliability score is used to determine the given user's eligibility to provide any further input regarding the legitimacy of other unknown/unclassified files.

As noted above, in some embodiments, a given user's reliability score is calculated based, at least in part, on the number of correct, or incorrect, classification by the user, i.e., instances the given user's input regarding the legitimacy of unknown/unclassified files corresponds, or fails to correspond, to the classifications of the unknown/unclassified files based on other data from other sources. In these instances, in some embodiments, only user's having provided a threshold number of correct, or incorrect, classifications at OBTAIN USER INPUT REGARDING THE LEGITIMACY/CLASSIFICATION OF THE GIVEN UNKNOWN FILE OPERATION 409 are eligible to participate, i.e., are asked for further input regarding the legitimacy of future unknown/unclassified files at REQUEST USER INPUT REGARDING THE LEGITIMACY/CLASSIFICATION OF THE GIVEN UNKNOWN FILE OPERATION 407.

In some embodiments, a given user may be selected for future input regarding the legitimacy of future unknown/unclassified files even though the user's reliability score shows that the user consistently incorrectly classifies the legitimacy of unknown/unclassified files. In essence, this user is treated as an inverse classifier and the user's further classifications regarding the legitimacy of future unknown/unclassified files is considered/treated as the opposite of the actual/correct classification of future unknown/unclassified files. In short, the user is treated as a consistently incorrect, or hostile, classifier.

As also noted above, in some embodiments, a given user's reliability score is a ratio of number of instances the given user's input regarding the legitimacy of unknown/unclassified files corresponds to the classification of the unknown/unclassified files based on other sources to the number of instances the given user's input regarding the legitimacy of unknown/unclassified files does not correspond to the classification of the unknown/unclassified files based on other sources.

Once again, in some embodiments, a given user may be selected for future input regarding the legitimacy of future unknown/unclassified files even though the user's reliability score shows that the user consistently incorrectly classifies the legitimacy of unknown/unclassified files and the user's future classifications regarding the legitimacy of future unknown/unclassified files is considered/treated as the opposite of the actual/correct classification of future unknown/unclassified files.

In some embodiments, at USE THE USER'S RELIABILITY SCORE TO DETERMINE THE VALUE OF THE FUTURE INPUT FROM THE USER REGARDING THE LEGITIMACY/CLASSIFICATION OF THE UNKNOWN FILE OPERATION 419, the given user's reliability score is used to weight, filer, or otherwise transform, the value assigned to the user's future input data regarding the legitimacy of future unknown/unclassified files.

For instance, in some embodiments, user input obtained at OBTAIN USER INPUT REGARDING THE LEGITIMACY/CLASSIFICATION OF THE GIVEN UNKNOWN FILE OPERATION 409 from a user having a high, and/or threshold, user reliability score may be weighted and assigned a greater value using a multiplier based on the user's reliability score. In some embodiments, user input obtained at OBTAIN USER INPUT REGARDING THE LEGITIMACY/CLASSIFICATION OF THE GIVEN UNKNOWN FILE OPERATION 409 from a user having a low, and/or threshold, user reliability score may be weighted and assigned a lesser value using a multiplier based on the user's reliability score. In some embodiments, user input obtained at OBTAIN USER INPUT REGARDING THE LEGITIMACY/CLASSIFICATION OF THE GIVEN UNKNOWN FILE OPERATION 409 from a user having either a consistently high or consistently low user reliability score may be weighted accordingly based on the consistency of the input.

In other embodiments, at USE THE USER'S RELIABILITY SCORE TO DETERMINE THE VALUE OF THE FUTURE INPUT FROM THE USER REGARDING THE LEGITIMACY/CLASSIFICATION OF THE UNKNOWN FILE OPERATION 419 the given user's reliability score of CALCULATE A USER RELIABILITY SCORE FOR THE USER BASED, AT LEAST IN PART, ON THE COMPARISON OF THE CLASSIFICATION OF THE GIVEN UNKNOWN FILE WITH THE USER'S INPUT REGARDING THE LEGITIMACY/CLASSIFICATION OF THE UNKNOWN FILE OPERATION 417 is used to classify the given user as a source of data/input regarding the legitimacy of other unknown/unclassified files; thereby transforming a status of the given user as a source of data/input regarding the legitimacy of other unknown/unclassified files, using any method desired by either the provider of the security system of MONITOR FILES DOWNLOADED ONTO A USER'S COMPUTING SYSTEM USING A SECURITY SYSTEM OPERATION 403 and/or the provider of process for employing user input to classify unknown files 400.

As discussed below, in one embodiment, the user reliability score for multiple users is calculated at CALCULATE A USER RELIABILITY SCORE FOR THE USER BASED, AT LEAST IN PART, ON THE COMPARISON OF THE CLASSIFICATION OF THE GIVEN UNKNOWN FILE WITH THE USER'S INPUT REGARDING THE LEGITIMACY/CLASSIFICATION OF THE UNKNOWN FILE OPERATION 417 and users having acquired the required threshold user reliability score, and/or classification/status, are used as sources of data/input regarding the legitimacy of other unknown/unclassified files, thereby, creating a pool of qualified users to classify future unknown/unclassified files via requests for user input generated at REQUEST USER INPUT REGARDING THE LEGITIMACY/CLASSIFICATION OF THE GIVEN UNKNOWN FILE OPERATION 407.

As also discussed below, in one embodiment, this pool of qualified users is then to classify future unknown/unclassified files is used to help classify future new unknown/unclassified files that are actually downloaded and/or activated on the users' computing systems. Consequently, using one embodiment of process for employing user input to classify unknown files 400, a pool of users of proven ability is created and used to supplement a security system and/or a file classification system in instances where the security system and/or a file classification system is unable to classify a given file. As a result, process for employing user input to classify unknown files 400 provides security systems and/or file classification systems crucial input to cover security gaps that arise due to lack of available comparison and/or file classification data.

Returning to FIG. 4, in one embodiment, once the given user's reliability score of CALCULATE A USER RELIABILITY SCORE FOR THE USER BASED, AT LEAST IN PART, ON THE COMPARISON OF THE CLASSIFICATION OF THE GIVEN UNKNOWN FILE WITH THE USER'S INPUT REGARDING THE LEGITIMACY/ CLASSIFICATION OF THE UNKNOWN FILE OPERATION 417 is used to classify the given user as a source of data/input regarding the legitimacy of other unknown/unclassified files; thereby transforming a status of the given user as a source of data/input regarding the legitimacy of other unknown/unclassified files at USE THE USER'S RELIABILITY SCORE TO DETERMINE THE VALUE OF THE FUTURE INPUT FROM THE USER REGARDING THE LEGITIMACY/CLASSIFICATION OF THE UNKNOWN FILE OPERATION 419, process flow proceeds to USE USERS HAVING DEFINED RELIABILITY SCORES TO PROVIDE FUTURE INPUT REGARDING THE LEGITIMACY/CLASSIFICATION OF UNKNOWN FILES OPERATION 421.

In one embodiment, the user reliability score for multiple user's is calculated at CALCULATE A USER RELIABILITY SCORE FOR THE USER BASED, AT LEAST IN PART, ON THE COMPARISON OF THE CLASSIFICATION OF THE GIVEN UNKNOWN FILE WITH THE USER'S INPUT REGARDING THE LEGITIMACY/CLASSIFICATION OF THE UNKNOWN FILE OPERATION 417 and at USE USERS HAVING DEFINED RELIABILITY SCORES TO PROVIDE FUTURE INPUT REGARDING THE LEGITIMACY/CLASSIFICATION OF UNKNOWN FILES OPERATION 421 users having acquired a defined user reliability score, and/or classification/status are used as sources of data/input regarding the legitimacy of other unknown/unclassified files, thereby, creating a pool of qualified users to classify future unknown/unclassified files via requests for user input generated at REQUEST USER INPUT REGARDING THE LEGITIMACY/CLASSIFICATION OF THE GIVEN UNKNOWN FILE OPERATION 407.

In one embodiment, at USE USERS HAVING DEFINED RELIABILITY SCORES TO PROVIDE FUTURE INPUT REGARDING THE LEGITIMACY/CLASSIFICATION OF UNKNOWN FILES OPERATION 421 this pool of qualified users is then used to help classify future new unknown/unclassified files that are actually downloaded and/or activated on the users' computing systems. Consequently, using one embodiment of process for employing user input to classify unknown files 400, a pool of users of proven ability is created and used to supplement a security system and/or a file classification system in instances where the security system and/or a file classification system is unable to classify a given file. As a result, process for employing user input to classify unknown files 400 provides security systems and/or file classification systems crucial input to cover security gaps that arise due to lack of available comparison and/or file classification data.

In one embodiment, once users having acquired a defined user reliability score, and/or status, are identified and are used as sources of data/input regarding the legitimacy of other unknown/unclassified files, thereby, creating a pool of qualified users to classify future unknown/unclassified files via requests for user input generated at REQUEST USER INPUT REGARDING THE LEGITIMACY/CLASSIFICATION OF THE GIVEN UNKNOWN FILE OPERATION 407 at USE USERS HAVING DEFINED RELIABILITY SCORES TO PROVIDE FUTURE INPUT REGARDING THE LEGITIMACY/CLASSIFICATION OF UNKNOWN FILES OPERATION 421, process flow proceeds to MONITOR AND UPDATE THE USER'S RELIABILITY SCORE ON A PERIODIC BASIS OPERATION 423.

In one embodiment, at MONITOR AND UPDATE THE USER'S RELIABILITY SCORE ON A PERIODIC BASIS OPERATION 423 the results of future comparisons of the given user's input regarding the legitimacy of the unknown/unclassified files and the eventual classification of the unknown/unclassified files based on other sources are monitored and are analyzed to periodically update the given user's reliability score.

In one embodiment, at MONITOR AND UPDATE THE USER'S RELIABILITY SCORE ON A PERIODIC BASIS OPERATION 423 the results of future comparisons of data indicating the given user's input regarding the legitimacy of the unknown/unclassified files, such as user input data 345 of user data module 343 of security system module 334 of security system memory 330 of security system provider computing system 150 of FIG. 3, and the data indicating the eventual classification of the unknown/unclassified files based on other sources, such as known file classification data 341 of classification module 335 of security system module 334 of security system memory 330 of security system provider computing system 150 of FIG. 3, are monitored and are analyzed by a processor, such as CPU(s) 301, using user reliability score monitoring module 351 that includes procedures, data, and/or instructions, associated with monitoring results of comparisons of the given user's input regarding the legitimacy of the unknown/unclassified files and the eventual classification of the unknown/unclassified files to periodically update and transform the given user's reliability score.

Returning to FIG. 4, in one embodiment, at MONITOR AND UPDATE THE USER'S RELIABILITY SCORE ON A PERIODIC BASIS OPERATION 423 the user's reliability score is then updated based on the results of comparisons of the given user's input regarding the legitimacy of the unknown/unclassified files and the eventual classification of the unknown/unclassified files based on other sources and the updated reliability score data is transferred to a user history and reliability score module, such as user history and reliability score module 349 of user data module 343 of security system module 334 of security system memory 330 of security system provider computing system 150 of FIG. 3.

Since, using one embodiment of process for employing user input to classify unknown files 400, a given user's input regarding the legitimacy of unknown/unclassified files is monitored and the given user's reliably score is monitored and updated as described above, if a given user's reliability score changes, the classification of the user, and/or the value placed on the user's input, is updated to reflect the change. As a result, the value assigned to a given user's input is dynamic and reflective of the user's current activity. This feature not only ensures that a user's input is more accurately valued, but it also helps prevent the an given user from "gaming" the security system by first establishing themselves as one classification of user, such as a user having a high reliability score, and then providing false input in order to circumvent the security system, or at least degrade its effectiveness. Consequently, in one embodiment, the pool of qualified users created to classify future unknown/unclassified files of USE USERS HAVING DEFINED RELIABILITY SCORES TO PROVIDE FUTURE INPUT REGARDING THE LEGITIMACY/CLASSIFICATION OF UNKNOWN FILES OPERATION 421 is periodically re-qualified; thereby providing more accurate and trusted results.

As discussed above, using one embodiment of process for employing user input to classify unknown files 400, the reliability of a given user is established based on actual empirical data indicating the user's reliability as a source of input regarding the legitimacy of unknown/unclassified files. In one embodiment, a pool of users of proven ability to classify unknown/unclassified files is then created and used to help classify future new unknown/unclassified files that are actually downloaded and/or activated on the users' computing systems. Consequently, using one embodiment of process for employing user input to classify unknown files 400, a pool of users of proven ability is created and used to supplement a security system and/or a file classification system in instances where the security system and/or a file classification system is unable to classify a given file. As a result, process for employing user input to classify unknown files 400 provides security systems and/or file classification systems crucial input to cover security gaps that arise due to lack of available comparison and/or file classification data.

In addition, using one embodiment of process for employing user input to classify unknown files 400, user's are assigned a user reliability score, and their input is valued, based on actual empirical data indicating the user's reliability as a source of data regarding the legitimacy of unknown/unclassified files. Consequently, using one embodiment of process for employing user input to classify unknown files 400, the fact that users have varying levels of ability to correctly classify new unknown/unclassified files as legitimate or malicious is addressed by the fact that the a given user's input is valued based on the user's actual historical performance.

In addition, using one embodiment of process for employing user input to classify unknown files 400, user's are only asked to provide input regarding the legitimacy of unknown/unclassified files actually downloaded and/or activated on the user's computing system. Consequently, using process for employing user input to classify unknown files 400, user's are only contacted for data that is relevant to the user; thereby avoiding unnecessary interference with the user's activities and potentially eliminating irrelevant user input requests.

In addition, using one embodiment of process for employing user input to classify unknown files 400, a given user's input regarding the legitimacy of unknown/unclassified files is monitored and the given user's reliably score is updated. Consequently, if a given user's reliability score changes, the classification of the user, and/or the value placed on the user's input, is updated to reflect the change. As a result, the value assigned to a given user's input is dynamic and reflective of the user's current activity. This feature not only ensures that a user's input is more accurately valued, but it also helps prevent the given user from "gaming" the security system.

In addition, using one embodiment of process for employing user input to classify unknown files 400, input from user's with both high and low reliability scores can be utilized. In one embodiment, input from a user having a high reliability score is valued based on the user's reliably score and the actual file classification input provided by the user is used. On the other hand, input from a user having a low reliability score is also valued based on the user's reliably score but is treated as inverse classification data, i.e., the opposite classification to that provided by the user is applied. In short, the user with a low reliability score is treated as a consistently incorrect, or hostile, classifier.

As a result of these and other features described herein, using one embodiment of process for employing user input to classify unknown files 400, new files, both malware and legitimate files, that are currently incorrectly classified using conventional security systems, can be more accurately and consistently classified; thereby providing more complete and consistent protection of computing, information sharing, and communication systems.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "monitoring", "obtaining", "requesting", "storing", "saving", "classifying", "comparing", "calculating", "processing", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for employing user input to classify unknown files comprising:

using a processor associated with a computing system to monitor files downloaded onto a given user computing system;

using a processor associated with a computing system to compare a given file downloaded onto the given user computing system with known file classification data in an attempt to classify the given file downloaded onto the given user computing system as a malicious file or a legitimate file;

as a result of the comparison of the given file downloaded onto the given user computing system with the known file classification data, determining that the given file downloaded onto the given user computing system cannot currently be classified as either a malicious file or a legitimate file, thereby transforming the status of the given file downloaded onto the given user computing system to a given unknown/unclassified file;

requesting user input regarding the legitimacy of the given unknown/unclassified file from a given user associated with the given user computing system;

obtaining user input regarding the legitimacy of the given unknown/unclassified file from the given user associated with the given user computing system;

storing data representing the user input regarding the legitimacy of the given unknown/unclassified file in a memory system associated with a computing system;

obtaining data representing a classification of the given unknown/unclassified file from at least one source other than the given user associated with the given user computing system, thereby transforming the status of the given unknown/unclassified file downloaded onto the given user computing system to a known/classified file;

using a processor associated with a computing system to compare the data representing the user input regarding the legitimacy of the given unknown/unclassified file with the data representing the classification of the given unknown/unclassified file from at least one source other than the given user associated with the given user computing system to determine the accuracy of the user input regarding the legitimacy of the given unknown/unclassified file;

using a processor associated with a computing system to calculate a reliability score to be associated with the given user, the reliability score being calculated based, at least in part, on the comparison of the data representing the user input regarding the legitimacy of the given unknown/unclassified file with the data representing a classification of the given unknown/unclassified file from at least one source other than the given user; and using a processor associated with a computing system to the determine a value to be assigned to future user input regarding the legitimacy of unknown/unclassified files from the given user based, at least in part, on the given user's reliability score, thereby transforming subsequent data representing user input regarding the legitimacy of unknown/unclassified files from the given user into weighted data representing user input regarding the legitimacy of unknown/unclassified files.

2. The computing system implemented process for employing user input to classify unknown files of claim 1, wherein:

the data representing a classification of the given unknown/unclassified file from at least one source other than the given user associated with the given user computing system is obtained from one or more sources other than the given user associated with the given user computing system selected from the group of sources other than the given user associated with the given user computing system consisting of:

analysis of the given unknown/unclassified file performed by a security system associated with the computing system implemented process for employing user input to classify unknown files;

analysis of the given unknown/unclassified file performed by a third party; and user input from one or more users other than the given user associated with the given user computing system.

3. The computing system implemented process for employing user input to classify unknown files of claim 1, wherein:

the reliability score to be associated with the given user is calculated based on data representing the user input regarding the legitimacy of unknown/unclassified files being consistent with data representing a classification of unknown/unclassified files from at least one source other than the given user a threshold number of times.

4. The computing system implemented process for employing user input to classify unknown files of claim 1, wherein:

the reliability score to be associated with the given user is calculated based a ratio of the number of instances the data representing the user input regarding the legitimacy of a given unknown/unclassified file is consistent with the data representing the classification of a given unknown/unclassified file from at least one source other than the given user and the number of instances the data representing the user input regarding the legitimacy of a given unknown/unclassified file is inconsistent with the data representing the classification of a given unknown/unclassified file from at least one source other than the given user.

5. The computing system implemented process for employing user input to classify unknown files of claim 1, wherein:

the value to be assigned to future user input regarding the legitimacy of unknown/unclassified files from the given user based, at least in part, on the given user's reliability score, takes the form of a multiplier used to weight data representing future user input regarding the legitimacy of unknown/unclassified files from the given user.

6. The computing system implemented process for employing user input to classify unknown files of claim 1, wherein:

the value to be assigned to future user input regarding the legitimacy of unknown/unclassified files from the given user based, at least in part, on the given user's reliability score, takes the form of requesting user input regarding the legitimacy of unknown/unclassified files only from users having a threshold user reliability score.

7. The computing system implemented process for employing user input to classify unknown files of claim 1, further comprising:

using a processor associated with a computing system to periodically monitor data representing the comparison of user input regarding the legitimacy of unknown/unclassified files with data representing the classification of unknown/unclassified files from at least one source other than the given user associated with the given user computing system to determine the on-going accuracy of user input regarding the legitimacy of unknown/unclassified files from the given user;

using a processor associated with a computing system to transform the reliability score associated with the given user, based, at least in part, on the monitoring of the data representing the comparison of user input regarding the legitimacy of unknown/unclassified files with data representing the classification of unknown/unclassified files from at least one source other than the given user associated with the given user computing system; and using a processor associated with a computing system to the transform a value to be assigned to future user input regarding the legitimacy of unknown/unclassified files from the given user based, at least in part, on the given user's transformed reliability score, thereby transforming subsequent data representing user input regarding the legitimacy of unknown/unclassified files from the given user into weighted data representing user input regarding the legitimacy of unknown/unclassified files.

8. A system for employing user input to classify unknown files comprising:

a given user computing system;

a security system associated with the given user computing system;

a security system provider computing system;

a processor associated with the security system provider computing system, the processor associated with the security system provider computing system executing at least part of a computing system implemented process for employing user input to classify unknown files, the computing system implemented process for employing user input to classify unknown files comprising:

using the processor associated with the security system provider computing system to monitor files downloaded onto the given user computing system;

using the processor associated with the security system provider computing system to compare a given file downloaded onto the given user computing system with known file classification data in a memory system accessible by the processor associated with the security system provider computing system in an attempt to classify the given file downloaded onto the given user computing system as a malicious file or a legitimate file;

as a result of the comparison of the given file downloaded onto the given user computing system with the known file classification data, determining that the given file downloaded onto the given user computing system cannot currently be classified as either a malicious file or a legitimate file by the security system associated with the given user computing system, thereby transforming the status of the given file downloaded onto the given user computing system to a given unknown/unclassified file;

the security system associated with the given user computing system requesting user input regarding the legitimacy of the given unknown/unclassified file from a given user associated with the given user computing system;

the security system associated with the given user computing system obtaining user input regarding the legitimacy of the given unknown/unclassified file from the given user associated with the given user computing system;

storing data representing the user input regarding the legitimacy of the given unknown/unclassified file in a memory system accessible by the security system provider computing system;

the security system associated with the given user computing system obtaining data representing a classification of the given unknown/unclassified file from at least one source other than the given user associated with the given user computing system, thereby transforming the status of the given unknown/unclassified file downloaded onto the given user computing system to a known/classified file;

using the processor associated with the security system provider computing system to compare the data representing the user input regarding the legitimacy of the given unknown/unclassified file with the data representing the classification of the given unknown/unclassified file from at least one source other than the given user associated with the given user computing system to determine the accuracy of the user input regarding the legitimacy of the given unknown/unclassified file;

using the processor associated with the security system provider computing system to calculate a reliability score to be associated with the given user, the reliability score being calculated based, at least in part, on the comparison of the data representing the user input regarding the legitimacy of the given unknown/unclassified file with the data representing a classification of the given unknown/unclassified file from at least one source other than the given user; and using the processor associated with the security system provider computing system to the determine a value to be assigned to future user input regarding the legitimacy of unknown/unclassified files from the given user based, at least in part, on the given user's reliability score, thereby transforming subsequent data representing user input regarding the legitimacy of unknown/unclassified files from the given user into weighted data representing user input regarding the legitimacy of unknown/unclassified files.

9. The system for employing user input to classify unknown files of claim 8, wherein:

the data representing a classification of the given unknown/unclassified file from at least one source other than the given user associated with the given user computing system is obtained from one or more sources other than the given user associated with the given user computing system selected from the group of sources other than the given user associated with the given user computing system consisting of:

analysis of the given unknown/unclassified file performed by the security system associated with the computing system implemented process for employing user input to classify unknown files;

analysis of the given unknown/unclassified file performed by a third party; and user input from one or more users other than the given user associated with the given user computing system.

10. The system for employing user input to classify unknown files of claim 8, wherein:

the reliability score to be associated with the given user is calculated based on data representing the user input regarding the legitimacy of unknown/unclassified files being consistent with data representing a classification of unknown/unclassified files from at least one source other than the given user a threshold number of times.

11. The system for employing user input to classify unknown files of claim 8, wherein:

the reliability score to be associated with the given user is calculated based a ratio of the number of instances the data representing the user input regarding the legitimacy of a given unknown/unclassified file is consistent with the data representing the classification of a given unknown/unclassified file from at least one source other than the given user and the number of instances the data representing the user input regarding the legitimacy of a given unknown/unclassified file is inconsistent with the data representing the classification of a given unknown/unclassified file from at least one source other than the given user.

12. The system for employing user input to classify unknown files of claim 8, wherein:

the value to be assigned to future user input regarding the legitimacy of unknown/unclassified files from the given user based, at least in part, on the given user's reliability score, takes the form of a multiplier used to weight data representing future user input regarding the legitimacy of unknown/unclassified files from the given user.

13. The system for employing user input to classify unknown files of claim 8, wherein:

the value to be assigned to future user input regarding the legitimacy of unknown/unclassified files from the given user based, at least in part, on the given user's reliability score, takes the form of requesting user input regarding the legitimacy of unknown/unclassified files only from users having a threshold user reliability score.

14. The system for employing user input to classify unknown files of claim 8, wherein:

the given user computing system and the security system provider computing system are communicably coupled in a cloud computing environment.

15. The system for employing user input to classify unknown files of claim 8, further comprising:

using the processor associated with the security system provider computing system to periodically monitor data representing the comparison of user input regarding the legitimacy of unknown/unclassified files with data representing the classification of unknown/unclassified files from at least one source other than the given user associated with the given user computing system to determine the on-going accuracy of user input regarding the legitimacy of unknown/unclassified files from the given user;

using the processor associated with the security system provider computing system to transform the reliability score associated with the given user, based, at least in part, on the monitoring of the data representing the comparison of user input regarding the legitimacy of unknown/unclassified files with data representing the classification of unknown/unclassified files from at least one source other than the given user associated with the given user computing system; and using the processor associated with the security system provider computing system to the transform a value to be assigned to future user input regarding the legitimacy of unknown/unclassified files from the given user based, at least in part, on the given user's transformed reliability score, thereby transforming subsequent data representing user input regarding the legitimacy of unknown/unclassified files from the given user into weighted data representing user input regarding the legitimacy of unknown/unclassified files.

16. A system for employing user input to classify unknown files comprising:

a given user computing system;

a security system associated with the given user computing system;

a security system provider computing system;

a processor associated with the given user computing system, the processor associated with the given user computing system executing at least part of a computing system implemented process for employing user input to classify unknown files, the computing system implemented process for employing user input to classify unknown files comprising:

using the processor associated with the given user computing system to monitor files downloaded onto the given user computing system;

using the processor associated with the given user computing system to compare a given file downloaded onto the given user computing system with known file classification data in a memory system accessible by the processor associated with the given user computing system in an attempt to classify the given file downloaded onto the given user computing system as a malicious file or a legitimate file;

as a result of the comparison of the given file downloaded onto the given user computing system with the known file classification data, determining that the given file downloaded onto the given user computing system cannot currently be classified as either a malicious file or a legitimate file by the security system associated with the given user computing system, thereby transforming the status of the given file downloaded onto the given user computing system to a given unknown/unclassified file;

the security system associated with the given user computing system requesting user input regarding the legitimacy of the given unknown/unclassified file from a given user associated with the given user computing system;

the security system associated with the given user computing system obtaining user input regarding the legitimacy of the given unknown/unclassified file from the given user associated with the given user computing system;

storing data representing the user input regarding the legitimacy of the given unknown/unclassified file in a memory system accessible by the security system;

the security system associated with the given user computing system obtaining data representing a classification of the given unknown/unclassified file from at least one source other than the given user associated with the given user computing system, thereby transforming the status of the given unknown/unclassified file downloaded onto the given user computing system to a known/classified file;

using a processor associated with a computing system to compare the data representing the user input regarding the legitimacy of the given unknown/unclassified file with the data representing the classification of the given unknown/unclassified file from at least one source other than the given user associated with the given user computing system to determine the accuracy of the user input regarding the legitimacy of the given unknown/unclassified file;

using a processor associated with a computing system to calculate a reliability score to be associated with the given user, the reliability score being calculated based, at least in part, on the comparison of the data representing the user input regarding the legitimacy of the given unknown/unclassified file with the data representing a classification of the given unknown/unclassified file from at least one source other than the given user; and using a processor associated with a computing system to the determine a value to be assigned to future user input regarding the legitimacy of unknown/unclassified files from the given user based, at least in part, on the given user's reliability score, thereby transforming subsequent data representing user input regarding the legitimacy of unknown/unclassified files from the given user into weighted data representing user input regarding the legitimacy of unknown/unclassified files.

17. The system for employing user input to classify unknown files of claim 16, wherein:
the value to be assigned to future user input regarding the legitimacy of unknown/unclassified files from the given user based, at least in part, on the given user's reliability score, takes the form of a multiplier used to weight data representing future user input regarding the legitimacy of unknown/unclassified files from the given user.

18. The system for employing user input to classify unknown files of claim 16, wherein:
the value to be assigned to future user input regarding the legitimacy of unknown/unclassified files from the given user based, at least in part, on the given user's reliability score, takes the form of the security system associated with the user computing system requesting user input regarding the legitimacy of unknown/unclassified files only from users having a threshold user reliability score.

19. The system for employing user input to classify unknown files of claim 16, wherein:
the given user computing system and the security system provider computing system are communicably coupled in a cloud computing environment.

20. The system for employing user input to classify unknown files of claim 16, further comprising:
using a processor associated with a computing system to periodically monitor data representing the comparison of user input regarding the legitimacy of unknown/unclassified files with data representing the classification of unknown/unclassified files from at least one source other than the given user associated with the given user computing system to determine the on-going accuracy of user input regarding the legitimacy of unknown/unclassified files from the given user;

using a processor associated with a computing system to transform the reliability score associated with the given user, based, at least in part, on the monitoring of the data representing the comparison of user input regarding the legitimacy of unknown/unclassified files with data representing the classification of unknown/unclassified files from at least one source other than the given user associated with the given user computing system; and using a processor associated with a computing system to the transform a value to be assigned to future user input regarding the legitimacy of unknown/unclassified files from the given user based, at least in part, on the given user's transformed reliability score, thereby transforming subsequent data representing user input regarding the legitimacy of unknown/unclassified files from the given user into weighted data representing user input regarding the legitimacy of unknown/unclassified files.

* * * * *

UNITED STATES PATENT AND TRADEMARK OFFICE
CERTIFICATE OF CORRECTION

| | | |
|---|---|---|
| PATENT NO. | : 8,060,577 B1 | Page 1 of 1 |
| APPLICATION NO. | : 12/491430 | |
| DATED | : November 15, 2011 | |
| INVENTOR(S) | : Robert James Conrad | |

It is certified that error appears in the above-identified patent and that said Letters Patent is hereby corrected as shown below:

In Column 30, Line 48, Claim 1, before "determine", delete "the";
In Column 32, Line 5, Claim 7, before "transform", delete "the";
In Column 33, Line 58, Claim 11, between "based" and "a ratio", insert --on--;
In Column 34, Line 47, Claim 15, before "transform", delete "the";
In Column 36, Line 2, Claim 16, before "determine", delete "the"; and
In Column 36, Line 52, Claim 20, before "transform", delete "the".

Signed and Sealed this
Eleventh Day of September, 2012

David J. Kappos
*Director of the United States Patent and Trademark Office*